US012799795B2

(12) United States Patent
Wolf et al.

(10) Patent No.: US 12,799,795 B2
(45) Date of Patent: Nov. 17, 2026

(54) REMOVABLE POP OUT WINDOWS AND CORRESPONDING LATCHES, ACTUATORS, LIVING HINGES, AND MODULAR DESIGNS

(71) Applicant: Rivian IP Holdings, LLC, Irvine, CA (US)

(72) Inventors: Philipp Josef Wolf, Dana Point, CA (US); Mark Lennard Taylor, Laguna Beach, CA (US); Andres Meana, Irvine, CA (US); Miguel Angel Ramirez Basilio, Aliso Viejo, CA (US); Raghav Jaswal, Coventry (GB); James John Alexander Dowle, Laguna Beach, CA (US); Spencer Charles Curran, Dana Point, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 19/051,888

(22) Filed: Feb. 12, 2025

(65) Prior Publication Data

US 2025/0257602 A1 Aug. 14, 2025

Related U.S. Application Data

(60) Provisional application No. 63/559,595, filed on Feb. 29, 2024, provisional application No. 63/552,777, filed on Feb. 13, 2024.

(51) Int. Cl.

*E05F 15/622* (2015.01)
*B60J 1/08* (2006.01)

(Continued)

(52) U.S. Cl.

CPC ............. *E05F 15/622* (2015.01); *B60J 1/085* (2013.01); *B60J 1/14* (2013.01); *E05B 81/06* (2013.01);

(Continued)

(58) Field of Classification Search

CPC .... B60J 1/085; B60J 1/14; E05D 1/06; E05D 5/0207; E05F 15/622; E05B 81/06

See application file for complete search history.

(56) References Cited

U.S. PATENT DOCUMENTS

| | | | | |
|---|---|---|---|---|
| 1,144,404 A * | 6/1915 | Williams | E05D 1/06 | 16/366 |
| 1,701,658 A * | 2/1929 | Asper | E05C 17/34 | 74/593 |

(Continued)

FOREIGN PATENT DOCUMENTS

| | | | |
|---|---|---|---|
| CN | 117595566 | * | 2/2024 |
| WO | 03/95320 | A1 | 11/2003 |
| WO | WO 2025/003108 | * | 1/2025 |

OTHER PUBLICATIONS

International Search Report and Written Opinion Mailed on Jun. 20, 2025 for WO Application No. PCT/US2025/015783, 19 pages.

*Primary Examiner* — Gregory J Strimbu

(74) *Attorney, Agent, or Firm* — HG Law LLP

(57) ABSTRACT

A removable pop out window provides a modular design. The window is configurable for multiple positions, including closed, vented, removable (e.g., pop out) positions, and combinations thereof. The window may include latches, actuators, living hinges, or a combination thereof to allow for the multiple positions. The window may be modular and configured to be installed either as a fixed window or a removable window in a vehicle.

10 Claims, 23 Drawing Sheets

(51) Int. Cl.

| | |
|---|---|
| ***B60J 1/14*** | (2006.01) |
| ***E05B 81/06*** | (2014.01) |
| ***E05B 85/20*** | (2014.01) |
| ***E05D 1/06*** | (2006.01) |
| ***E05D 5/02*** | (2006.01) |

(52) U.S. Cl.
CPC ................ *E05B 85/20* (2013.01); *E05D 1/06* (2013.01); *E05D 5/0207* (2013.01); *E05Y 2201/214* (2013.01); *E05Y 2201/638* (2013.01); *E05Y 2900/55* (2013.01)

(56) References Cited

U.S. PATENT DOCUMENTS

| | | | | |
|---|---|---|---|---|
| 4,186,524 | A * | 2/1980 | Pelchat | E05F 15/622 49/357 |
| 4,249,771 | A * | 2/1981 | Gergoe | E05F 11/06 74/89.17 |
| 4,918,865 | A * | 4/1990 | Hirai | E05F 15/63 49/357 |
| 5,966,871 | A * | 10/1999 | Tsuda | E05F 15/63 49/324 |
| 6,520,038 | B1 * | 2/2003 | Pfanzer | F16C 11/0604 74/89.42 |
| 6,666,484 | B1 | 12/2003 | Branch et al. | |
| 7,108,317 | B2 | 9/2006 | Tamura et al. | |
| 8,671,619 | B2 * | 3/2014 | Stenzel | E05F 15/63 49/324 |
| 2006/0220409 | A1 * | 10/2006 | Smith | E05D 7/1072 296/57.1 |
| 2018/0044965 | A1 * | 2/2018 | Takizawa | F16H 21/16 |
| 2019/0271182 | A1 * | 9/2019 | Lovasz | B60J 1/085 |
| 2022/0412140 | A1 | 12/2022 | Young et al. | |
| 2024/0200375 | A1 * | 6/2024 | Ginnard | E05C 1/04 |
| 2025/0257593 | A1 * | 8/2025 | Wolf | E05D 11/06 |
| 2025/0257597 | A1 * | 8/2025 | Wolf | E05F 15/622 |

* cited by examiner

FIG. 3A
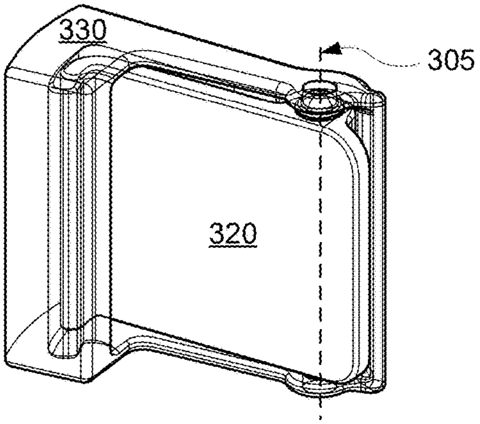
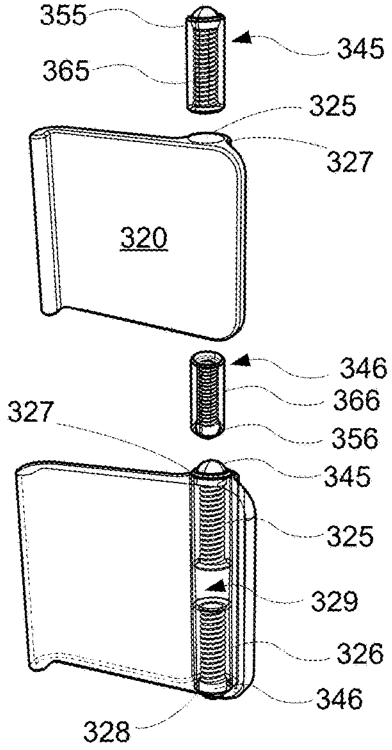
FIG. 3D
FIG. 3B
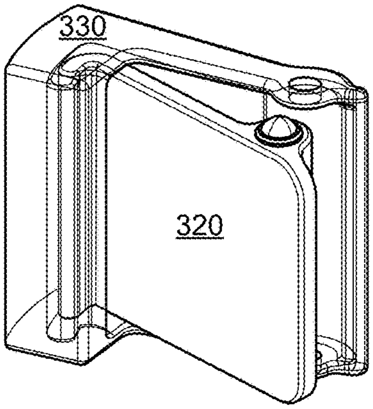
FIG. 3C
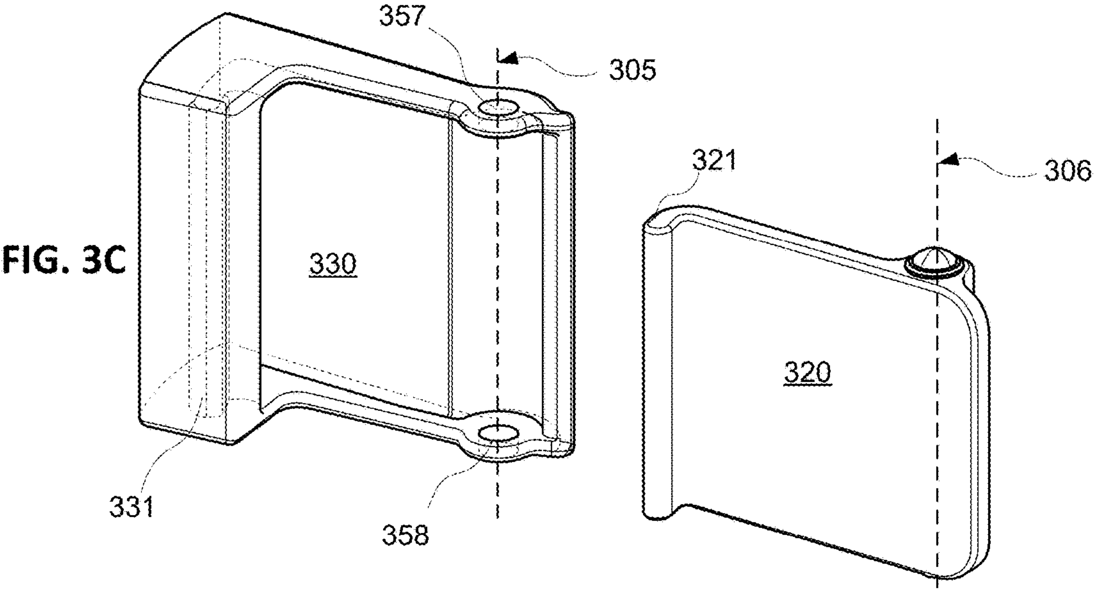

Open Position

REMOVABLE POP OUT WINDOWS AND CORRESPONDING LATCHES, ACTUATORS, LIVING HINGES, AND MODULAR DESIGNS

CROSS-REFERENCE TO RELATED APPLICATIONS

This application claims the benefit of U.S. Provisional Patent Application No. 63/552,777, filed Feb. 13, 2024, and U.S. Provisional Patent Application No. 63/559,595, filed Feb. 29, 2024, the disclosures of which are hereby incorporated by reference herein in their entireties.

INTRODUCTION

The present disclosure is directed to a removable pop out window and corresponding latches and actuators. In some embodiments, the present disclosure is directed to apparatuses, assemblies, systems, and methods for implementing a window that is configurable for multiple positions, including closed, vented, removable (e.g., pop out) positions, and combination thereof.

The present disclosure is also directed to living hinges and modular designs for removable pop out windows. In some embodiments, the present disclosure is directed to living hinges, modular designs, and related apparatuses, assemblies, systems, and methods for implementing a living hinge or a modular window that may, but need not, include the living hinge.

SUMMARY

In accordance with the present disclosure, apparatuses, assemblies, linear actuators, and related methods of operation are disclosed for implementing a window that is configurable for multiple positions including closed, vented, and removable positions. In some embodiments, a vehicle includes a window that is coupled to one or more of the abovementioned apparatuses, assemblies, and linear actuators. For example, users or drivers of the vehicle may configure the window to be in the closed position (e.g., for security, quiet driving, intra-vehicle climate control, any other suitable purpose, or any combination thereof), in the vented position (e.g., for letting air into the cabin without exposing a large volume of the vehicle, any other suitable purpose, or any combination thereof), or in the removable position (e.g., for recreation, maximizing airflow into the cabin, adventure sporting, convertible-like driving, any other suitable purpose, or any combination thereof).

In accordance with the present disclosure, living hinges, modular designs, and related apparatuses, assemblies, systems, and methods for implementing a living hinge or a modular window that may, but need not, include the living hinge are disclosed. In some embodiments, a vehicle includes a living hinge that releasably couples a window to a frame and/or support of the vehicle. For example, the living hinge may attach or detach from a frame or support and may similarly attach or detach from a window, such that the window is releasably coupled to the vehicle. In some embodiments, the living hinge includes a flange section that interfaces with a recess of a window or includes fasteners configured for releasable mating with a support, and the living hinge includes a base section that is affixed to a window or support. Therefore, the living hinge is releasably mated with at least one of the window or the support. In some embodiments, a modular window is configurable to be incorporated in a fixed installation (e.g., the window cannot be removed from a support structure without undue burden) and a removable installation (e.g., the window can be readily attached or detached from a support structure). Therefore, manufacturers of the vehicle can use the single modular window to serve multiple customer preferences (e.g., a fixed or a removable window installation).

In some embodiments, the present disclosure is directed to a modular window that includes glass, an encapsulation frame, a mechanical interface, and a mating feature. In some embodiments, the encapsulation frame surrounds the glass and has a first frame side and a second frame side opposite the first frame side, the mechanical interface is located on the first frame side, and the mating feature is located on the second frame side. In some embodiments, the encapsulation frame includes a region surrounding the glass and the mechanical interface. In some such embodiments, when the modular window is installed in a fixed installation, the region is configured to receive a glue bead, and when the modular window is installed in a venting or removable installation, the region is configured to receive a bulb seal. In some embodiments, the mating feature is located outside of the region. In some embodiments, the mechanical interface includes a ball of a ball joint and a plurality of protrusions surrounding the ball that extend away from the first frame side a greater amount than the ball. In some embodiments, the plurality of protrusions includes three protrusions. In some embodiments, the mating feature includes a slot configured to receive a flange. In some embodiments, the slot includes at least one location feature configured to mate with at least one corresponding locating feature of the flange. In some embodiments, the slot includes at least one recess in a sidewall of the slot, the flange includes at least one ridge, and the at least one ridge prevents the flange from entering the slot unless the at least one ridge is aligned with the at least one recess. In some embodiments, when the modular window is installed in a fixed installation, the mechanical interface does not interface with any corresponding structure, and when the modular window is installed in a vented or removable installation, the mechanical interface is coupled to an actuator.

In some embodiments, the present disclosure is directed to a modular window including glass, an encapsulation frame, a mechanical interface, a mating feature, and a glue bead. In some embodiments, the encapsulation frame surrounds the glass and has a first frame side and a second frame side opposite the first frame side, the mechanical interface is located on the first frame side, the mating feature is located on the second frame side, and the glue bead on the encapsulation frame surrounds the glass and the mechanical interface and secures the modular window to a frame. In some embodiments, the mechanical interface includes a ball joint feature and a plurality of protrusions that surround the ball joint feature. In some such embodiments, the plurality of protrusions extends away from the first frame side a greater amount than the ball joint feature, and the plurality of protrusions extend into corresponding recesses of the frame. In some embodiments, the mating feature is arranged outside the glue bead. In some embodiments, the mating feature includes a slot. In some embodiments, the slot includes at least one recess in a sidewall of the slot.

In some embodiments, the present disclosure is directed to a modular window that includes glass, an encapsulation frame, a mechanical interface, a bulb seal, an actuator, and a living hinge. In some embodiments, the encapsulation frame surrounds the glass and has a first frame side and a second frame side opposite the first frame side, the mechanical interface is located on the first frame side, the bulb seal is secured to the encapsulation frame (e.g., seated against such that it does not move independently when secured), the bulb seal surrounds the glass and the mechanical interface, the actuator is configured to be releasably secured to the mechanical interface, and the living hinge is coupled to the second frame side. In some embodiments, the second frame side includes a mating feature. In some embodiments, the mating feature is located outside of the bulb seal and includes a slot configured to receive a flange of the living hinge. In some embodiments, the mechanical interface includes a first ball joint feature of a ball joint and the actuator includes a second ball joint feature of the ball joint.

In some embodiments, the present disclosure is directed to a method of assembling modular window that includes glass, an encapsulation frame, a mechanical interface, a mating feature, and a glue bead. In some embodiments, the method includes identifying an intended use of the modular window, applying a bead of glue to the encapsulation frame that surrounds the glass and the mechanical interface, and seating the modular window onto a frame to secure the modular window to the frame using the bead of glue.

In some embodiments, the present disclosure is directed to a method of assembling modular window that includes glass, an encapsulation frame, a mechanical interface, a mating feature, a bulb seal, a living hinge, and an actuator. In some embodiments, the method includes identifying an intended use of the modular window, and in response to the intended use being one of venting or removable, securing a bulb seal on the encapsulation frame, coupling a living hinge to the mating feature, and coupling an actuator to the mechanical interface.

In some embodiments, the present disclosure is directed to an apparatus that includes a latch receiver having a first main body and a recess, and a latch having a second main body rotatably coupled to the latch receiver about a hinge axis and a hook at an end of the second main body. In some embodiments, when the second main body is rotated against the first main body, the hook is clear of the recess such that the latch is detachable from the latch receiver. In some embodiments, as the second main body is rotated away from the first main body, the hook enters the recess. In some embodiments, the apparatus includes at least one detent feature that couples the latch to the latch receiver to form a rotatable coupling about the hinge axis. In some embodiments, the latch includes a first cavity along a first edge and a second cavity along a second edge opposite the first edge. In some embodiments, the apparatus includes a first ball detent positioned in the first cavity and a second ball detent positioned in the second cavity, where the hinge axis passes through the first ball detent and the second ball detent. In some such embodiments, the latch receiver includes first and second detent recess features configured to respectively receive the first and second ball detents. In some such embodiments, the first ball detent has a first spring applying a force on a first ball, the second ball detent has a second spring applying a force on a second ball, and when a lateral force is applied to the latch, opposing forces are applied by the first and second recesses on the first and second balls, which cause the first and second balls to respectively compress the first and second springs, thereby enabling the latch to detach from the latch receiver. In some embodiments, the latch receiver is configured to be coupled to a support, and the latch is configured to be coupled to a window and to enable rotation of the window from a closed position to a vented position. In some embodiments, when the window is in the closed position, the second main body is rotated away from the first main body and the hook is positioned in the recess. In some embodiments, when the window is in the vented position, the second main body is rotated closer to the first main body and the hook is at least partially positioned in the recess. In some such embodiments, the latch is configured to enable rotation of the window from the vented position to a removable position, and when the window is in the removable position, the second main body is rotated against the first main body and the hook is clear of the recess of the latch receiver. In some embodiments, the latch receiver includes a protrusion, the latch includes a recess proximate a second end of the second main body, and when the second main body is rotated away from the first main body, the protrusion of the latch receiver enters the recess of the latch such that an interface between the protrusion of the latch receiver and the recess of the latch prevents a lateral force from detaching the latch from the latch receiver.

In some embodiments, the present disclosure is directed to an assembly having a window, a window frame against which the window is configured to close, a latch receiver, and a latch. For example, the latch receiver has a first main body and a recess, and is coupled to the window frame. In a further example, the latch has a second main body rotatably coupled to the latch receiver about a hinge axis and a hook at an end of the second main body, and is coupled to the window. In some embodiments, when the second main body is rotated against the first main body, the hook is clear of the recess such that the latch is detachable from the latch receiver and the window is detachable from the window frame. In some embodiments, as the second main body is rotated away from the first main body, the hook enters the recess. In some embodiments, when the second main body is rotated away from the first main body and the hook is positioned in the recess, the window is in a closed position and an interface between the latch receiver and the hook prevents the latch from being detached from the latch receiver. In some embodiments, when the second main body is rotated against the first main body and a lateral force is applied to the latch, the latch detaches from the latch receiver. In some embodiments, the assembly includes a first ball detent and a second ball detent, respectively positioned in first and second cavities of the latch, where the first cavity of the latch is along a first edge and the second cavity of the latch is along a second edge opposite the first edge, and where the hinge axis passes through the first ball detent and the second ball detent. In some embodiments, the first ball detent has a first spring applying a force on a first ball, the second ball detent has a second spring applying a force on a second ball, and when the lateral force is applied to the latch, opposing forces are applied by the first and second recesses on the first and second balls, which cause the first and second balls to respectively compress the first and second springs, thereby enabling the latch to detach from the latch body. In some embodiments, when the window is in a closed position, the second main body is rotated away from the first main body and the hook is positioned in the recess of the latch receiver. In some embodiments, when the window is in the vented position, the second main body is rotated closer to the first main body and the hook is at least partially positioned in the recess of the latch receiver. In some embodiments, the present disclosure is directed to a window for a vehicle having an encapsulation frame and a latch coupled to the encapsulation frame. The encapsulation frame is configured to interface to a support arranged between pillars of the vehicle, for example. In some embodiments, in a closed configuration of the window, the latch is fully engaged with a latch receiver coupled to the support. In some embodiments, in a vented configuration of the window, the latch is partially engaged with the latch receiver. In some embodiments, in a removal configuration of the window, the latch is removable from the latch receiver. In some embodiments, the latch has a hook; the latch receiver has a recess; in the closed configuration, the hook is arranged fully in the recess; in the vented configuration, the hook is arranged partially in the recess; and in the removal configuration, the hook is clear of the recess. In some embodiments, the latch is detachably coupled to the latch receiver about a hinge axis, and the latch is configured to rotate relative to the latch receiver about the hinge axis. In some embodiments, the latch is configured to interface with a latch receiver or with a latch mount, and when engaged to the latch mount, the window remains in a closed configuration.

In some embodiments, the present disclosure is directed to a window disconnect having a keyed ball and a keyed socket configured to engage and disengage the keyed ball. In a first rotational orientation of the keyed socket, the keyed ball is locked in the keyed socket such that a window is locked. In a second rotational orientation of the keyed socket, the keyed ball is unlocked and removable from the keyed socket such that the window is removable. In some embodiments, the first rotational orientation and the second rotational orientation are between 80 and 100 degrees apart. In some embodiments, the keyed socket has a slot and the keyed ball has a ball having flats on opposite sides. In some such embodiments, in a first rotational orientation of the keyed socket, the flats are parallel with the sides of the slot such that the keyed ball can translate into and out of the keyed socket. Further, in a second rotational orientation of the keyed socket, the flats are misaligned with the sides of the slot such that the keyed ball cannot translate into or out of the keyed socket. In some embodiments, the window disconnect includes a base affixed to the window, and a collar rotatably coupled to the base, where the keyed socket is arranged at an end of the collar such that the keyed socket rotates with the collar. In some embodiments, the window disconnect includes an actuator coupled to the collar and configured to rotate the collar based on a control signal. In some embodiments, the window disconnect an arm coupled to the keyed ball, and an actuator that is coupled to the arm and configured to move the arm based on a control signal to cause the window to move relative to the support when the keyed ball is locked in the keyed socket. In some embodiments, the keyed ball is affixed to the window, and the keyed socket is coupled to a support. In some embodiments, the keyed ball is affixed to the window and the window disconnect includes an actuator coupled to the keyed socket and a support and that is configured to cause the keyed socket to translate and rotate. In some embodiments, the actuator is a linear actuator having a translation screw configured to rotate about an axis, a translation shaft configured to translate based on rotation of the translation screw, and a housing configured to control a rotational orientation of the translation shaft during translation. The translation shaft includes the keyed socket.

In some embodiments, the present disclosure is directed to a linear actuator having a translation screw configured to rotate about an axis, a translation shaft configured to translate based on rotation of the translation screw and having a ball joint element at an end, and a housing configured to control a rotational orientation of the translation shaft during translation. In some embodiments, during a first range of motion of the translation shaft, the rotational orientation is substantially constant, and during a second range of motion of the translation shaft, the rotational orientation varies. In some embodiments, the translation shaft has a groove along an exterior surface, and the housing has a boss that extends into the groove and controls the rotational orientation of the translation shaft. In some embodiments, the groove has a linear portion and a curved portion. During the first range of motion, the boss traverses the linear portion of the groove, and during the second range of motion, the boss traverses the curved portion of the groove. In some embodiments, the curved portion of the groove wraps at least 80 degrees around the translation shaft, and during the second range of motion, the translation shaft rotates at least 80 degrees while translating. In some embodiments, the ball joint element has a keyed socket configured to receive a keyed ball. During the first range of motion, the rotational orientation of the translation shaft maintains the keyed socket in a locked configuration relative to the keyed ball, and during the second range of motion, the translation shaft rotates the keyed socket into an unlocked configuration relative to the keyed ball. In some embodiments, the keyed ball is coupled to a window, and the first range of motion of the translation shaft causes the window to move from a closed position to a vented position. In some embodiments, the second range of motion of the translation shaft causes the window to move from the vented position to a removal position. In some embodiments, the present disclosure is directed to an apparatus having a window, a keyed ball coupled to the window, and a linear actuator. In some embodiments, the apparatus includes a hinge coupled to a first end of the window, and the first ball joint element is coupled proximate to a second end of the window opposite the first end. In some embodiments, the translation shaft has a groove having a linear portion and a curved portion, and the housing has a boss that extends into the groove and controls the rotational orientation of the translation shaft. During the first range of motion, the rotational orientation of the translation shaft maintains the keyed socket in a locked configuration relative to the keyed ball, during the second range of motion, the translation shaft rotates the keyed socket into an unlocked configuration relative to the keyed ball.

In some embodiments, the present disclosure is directed to a living hinge having a flange, one or more hinge sections connected to (e.g., in contact with such as abutting, including portions of a continuous component) the flange, and a base section connected to the one or more hinge sections (e.g., in contact with such as abutting, including portions of a continuous component). For example, the one or more hinge sections are configured to allow a window to move relative to a support, and the flange is configured to allow removal of the window from the support. In some embodiments, the one or more hinge sections include a first curved hinge section, a second curved hinge section, and a planar section between the first curved hinge section and the second curved hinged section. For example, the flange, the one or more hinge sections, and the base section form a u-shape. In some embodiments, the flange has an end surface configured to interface to the window, and the base section is configured to be affixed to the support. In some embodiments, the window has a recess formed from two walls and a bottom, and the flange is configured to interface with the recess such that the end surface of the flange interfaces with the bottom of the recess and opposite sides of the flange interface with the two walls of the recess. In some embodiments, a first wall of the two walls is positioned between the flange and the base section, and a second wall of the two walls is taller than the first wall and extends beyond the one or more curved hinge sections. In some embodiments, the recess is located along an edge of the window. In some embodiments, the window includes an encapsulation frame surrounding glass and wherein the recess located in the encapsulation frame. In some embodiments, the flange is configured to be affixed to the support, and the base section is configured to be affixed to the window. In some embodiments, the flange has one or more first fastening elements each having a large opening and a small opening, and the one or more second fastening elements each has a protrusion having a head and a neck coupling the head to the support. The large opening is sized to receive the head, and the small opening is sized to retain the head. In some embodiments, the one or more first fastening elements each further includes a choke point between the large opening and the small opening, and each choke point provides a snap-fit connection (e.g., a contact interface where a force is applied to lock the components together past some resistance to secure the interface) with the neck of a respective mushroom-head protrusion. In some embodiments, the window frame includes an encapsulation frame surrounding glass and the base section of the living hinge is affixed to a side of the encapsulation frame.

In some embodiments, the present disclosure is directed to a window having glass, an encapsulation frame affixed to the glass, and a living hinge. The living hinge includes a flange configured to be affixed to a support, and a base section coupled to the flange and configured to be affixed to the encapsulation frame, for example. The flange is capable of flexing relative to the base section. In some embodiments, the flange includes one or more first fastening elements each having a large opening and a small opening, and the one or more second fastening elements each has a protrusion comprising a head and a neck coupling the head to the support. The large opening is sized to receive the head, and the small opening is sized to retain the head. In some embodiments, the one or more first fastening elements each further includes a choke point between the large opening and the small opening, and each choke point provides a snap-fit connection with the neck of a respective mushroom-head protrusion. In some embodiments, the present disclosure is directed to a vehicle having a support and a window configured to interface with the support. The window includes a living hinge configured to couple the window to the support. The living hinge includes a flange, one or more hinge sections affixed to the flange, and a base section affixed to the one or more hinge sections opposite the flange. The flange is capable of flexing relative to the base section to allow the window to move relative to the support. In some embodiments, the flange has one or more first fastening elements each having a large opening and a small opening, and the one or more second fastening elements each has a protrusion having a head and a neck coupling the head to the support. The large opening is sized to receive the head, and the small opening is sized to retain the head. In some embodiments, the one or more first fastening elements each further includes a choke point between the large opening and the small opening, and each choke point provides a snap-fit connection with the neck of a respective mushroom-head protrusion.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 3A-3D show illustrative depictions of configurable coupling between a latch and a latch receiver, in accordance with some embodiments of the present disclosure;

DETAILED DESCRIPTION

Windows may be permanently affixed to support structures (e.g., window frames). In some circumstances, where a window can slide or pop out to be partially open (e.g., into a venting position), the window may still be permanently affixed to a support structure in at least one location or region (e.g., the window cannot be removed from the structure without at least some disassembly or undue burden). However, it may be desirable to have a window that is configurable to be in a closed position (e.g., the window forms a substantially air-tight seal with the support structure), to be in a vented position (e.g., the window is partially separated from the support structure, such that air may flow through an opening between the window and the support structure), or to be in a removed or a removable position (e.g., the window may be completely popped out and removed from the support structure).

Figure 1:
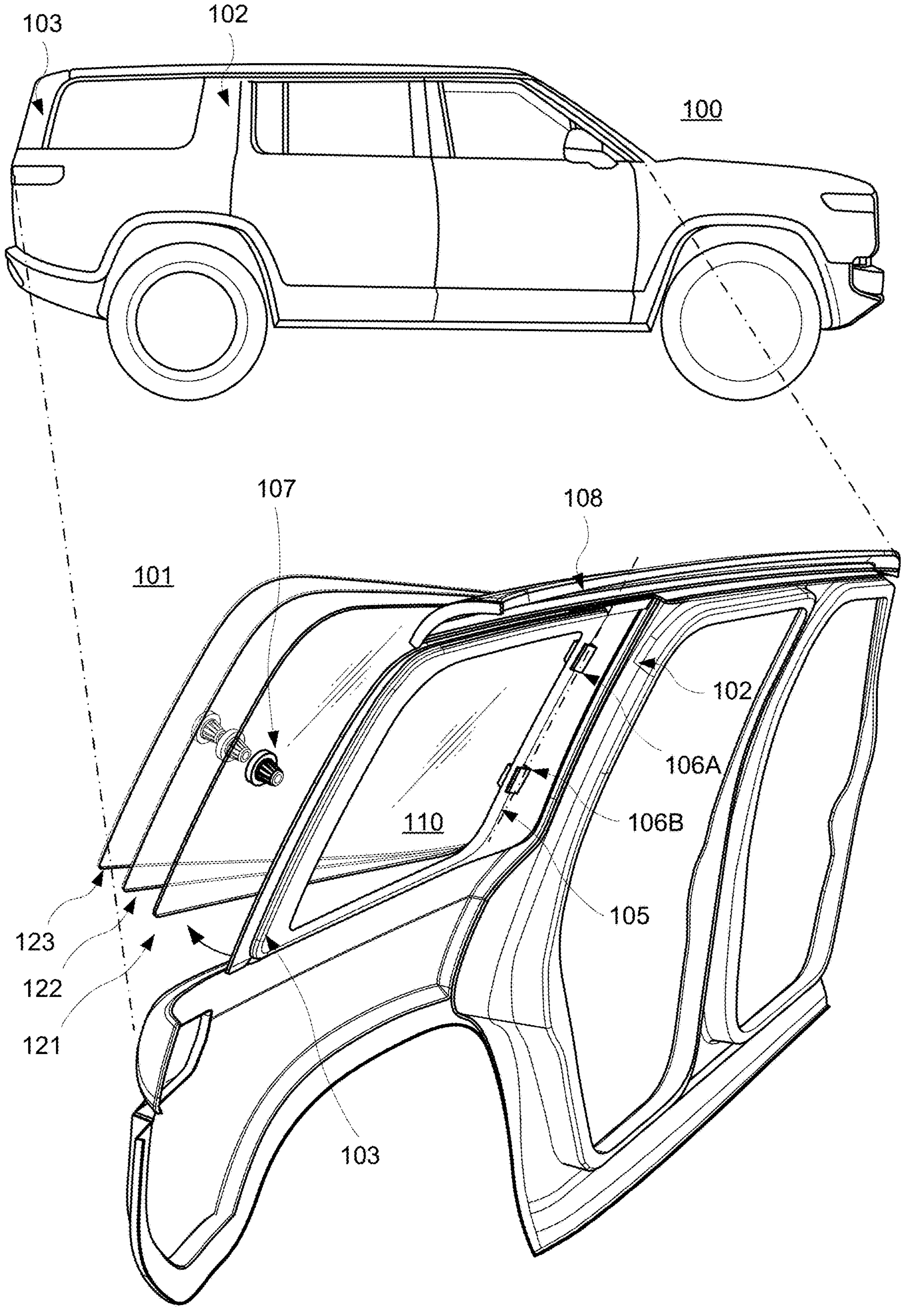
FIG. 1 is an illustrative depiction of a window that is configurable for multiple positions based on a latch apparatus, in accordance with some embodiments of the present disclosure.

FIG. 1 is an illustrative depiction of vehicle 100 including window 110 having configurable positions (e.g., closed, vented, and removable positions), a window disconnect, a latch apparatus, a hinge axis, and C and D pillars (e.g., respective pillars 102 and 103), in accordance with some embodiments of the present disclosure. In some embodiments, vehicle 100 may have three windows on each main side (e.g., driver side and passenger side), as shown in FIG. 1, although other window configurations (e.g., one, two, or four windows on each main side of the vehicle) are also contemplated and suitable for use with the teachings of the present disclosure.

In some embodiments, at least one window of the vehicle (e.g., window 110 between the C pillar 102 and D pillar 103, as shown in enlargement 101, or any other suitable window) is arranged such that window 110 is configurable for multiple positions (e.g., closed, vented, and removable positions). Enlargement 101 shows a cutaway view of the left side (e.g., driver's side) as viewed from an inside, rear position (e.g., behind a liftgate and laterally between D-pillars of vehicle 100). For example, window 110 may hinge around the hinge axis 105 (e.g., which may be parallel and proximate to C pillar 102, as shown, or any other suitable pillar) and may separate from support 108 (e.g., which may include at least some of D pillar 103, as shown) based on a force or translation applied by window disconnect 107 or an actuator and a corresponding configuration of one or more fastening apparatuses (e.g., latches such as latches 106, joints, ball joints, hinges, detents, sockets, receivers, screws, threads, shafts, any other suitable fastening apparatus, or any combination thereof).

As illustrated, window 110 may be configured to realize at least three configurable positions. In some embodiments, one of these configurable positions is the closed position, in which window 110 may be flush (e.g., substantially air-tight) with support 108 (e.g., a frame of vehicle 100). Support 108 may include the portions of the frame extending around the entire window (e.g., along the perimeter of window 110, also referred to as "window frame"), and may include one or more frame elements (e.g., pillars, roofline, sill, or other structures). For example, support 108 may include an entire window frame, or a portion thereof to which components of window 110 interface (e.g., abut, contact, fit against, or otherwise meet at a boundary). The closed position may be desirable for keeping the interior cabin of the vehicle secure, quiet, at a particular climate, any other suitable benefit, or any combination thereof.

In some embodiments, one of the configurable positions is the vented position, which may be based on a position of at least one latch assembly, such either or both of latch assemblies 106A and 106B (e.g., a latch position realized in response to an actuator movement or manual movement). For example, in the vented position, there may be one edge of window 110 that remains coupled to an edge of support 108 (e.g., along C pillar 102, as illustrated in FIG. 1) while the other three edges of window 110 (e.g., corresponding substantially to the other side, top and bottom) may be separated from support 108. It will be understood that a window, such as window 110, may be coupled to the edge of a support, such as support 108, using any suitable mechanism or interface (e.g., the coupling constrains the motion and position of window 110 relative to support 108), but does not require a direct connection (e.g., there may be an intermediate component). It will also be understood that some edges of window 110 may be rounded or otherwise may not form a strict top, bottom, or side (e.g., such that the window may have a top portion, side portions, and a bottom portion which need not be straight or have well defined endpoints). For example, the vented position may include a separation distance of a few millimeters (e.g., 1, 5, or 8 mm), a few centimeters (e.g., 1, 2, or 3 cm), a few inches (e.g., 0.5, 1, 2, or 3 in) or any other suitable separation distance between the window edge opposing the window edge coupled to the corresponding support (e.g., D pillar 103, as illustrated in FIG. 1). In some embodiments, the separation distance in the vented position is configurable (e.g., based on an input from the user, e.g., corresponding to a desired amount of air flow to permit in/out of the cabin). The vented position may be desirable for allowing fresh air into the cabin of vehicle 100 while maintaining a relatively small (e.g., compared to the area of window 110) area of open space (e.g., to prevent excess air from flowing into the cabin, or to preclude things from falling out of window 110). As illustrated, window 110 may achieve vented positions 121, 122, and 123 as window 110 is rotated about hinge axis 105 further from the closed position.

In some embodiments, one of the configurable positions is the removable position, which is also based on a position of at least one latch of latch assemblies 106A and 106B (e.g., the latch position realized in response to an actuator movement, e.g., where the actuator movement corresponding to the removable position is greater than that corresponding to the vented position). In the removable position, window 110 may be readily (e.g., without substantial force or damaging any structures) detached from support 108. For example, a latch element of either or both of latch assemblies 106A and 106B may include a latch coupled to window 110 may be detached from a latch receiver coupled to support 108, such that window 110 is not secured (e.g., not sealed against nor otherwise held tightly to prevent motion of window 110 or a portion thereof) to support 108 and may be fully removed from vehicle 100. The removable position may be desirable for recreational activities, maximizing airflow into the cabin, adventure sporting, convertible-like driving, any other suitable purpose, or any combination thereof. In an illustrative example, in some embodiments, in transitioning from the vented position to the removed position, the force required to remove the window may be the same as or similar to, or less than, the weight of window 110 (e.g., such that it is lifted away from support 108).

FIGS. 2A-2F show illustrative depictions of the aforementioned window positions with corresponding latch and latch receiver configurations, in accordance with some embodiments of the present disclosure. As illustrated, window 210 is arranged between C pillar 204 and a D pillar (not shown), and latch assemblies 206A and 206B couple window 210 to support 211 (e.g., as illustrated, support 211 includes the entire window frame extending around the periphery of window 210). Latch 220 may reside in multiple positions with respect to latch receiver 230, where various positions of latch 220 correspond to configurable positions of window 210. For example, the latch apparatus of FIG. 1 may include latch 220 and latch receiver 230 of FIGS. 2B, 2D, and 2F. In some embodiments, latch 220 rotates around hinge axis 205 to realize the various latch positions illustrated in FIGS. 2B, 2D, and 2F. In some embodiments, latch 220 and latch receiver 230 are coupled by at least one component (e.g., a detent). In some embodiments, the coupling component may be coaxial with hinge axis 205. As illustrated, latch 220 includes main body 222 and hook 221. For example, main body 222 may be a relatively flat body portion or panel that extends from a pivot (e.g., at hinge axis 105) and curves at the end (e.g., to form hook 221). In a further example, latch receiver 230 may include a relatively flat body portion that extends away from the pivot and includes a pocket (e.g., recess 231) at the other end. Latch 220 may include any suitable shape to act in concert with latch receiver 230 to allow a window to achieve a closed, vented, and removable configuration. Latch receiver 230 may include any suitable shape to interface with latch 220, to capture, constrain, and release hook 221, depending on the relative positions.

Figure 2A:
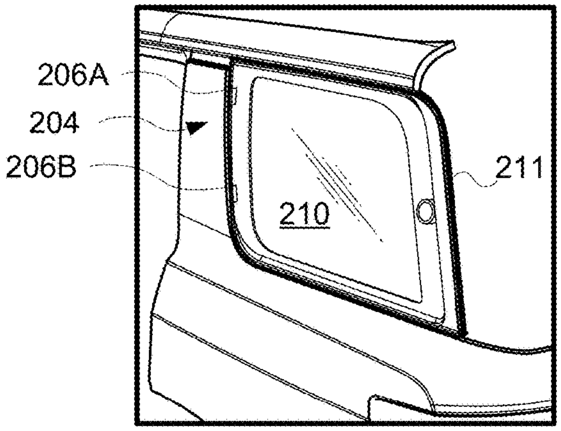
FIGS. 2A-2F include illustrative depictions showing configurable states of a window and corresponding states of a latch apparatus, in accordance with some embodiments of the present disclosure.
Figure 2B:
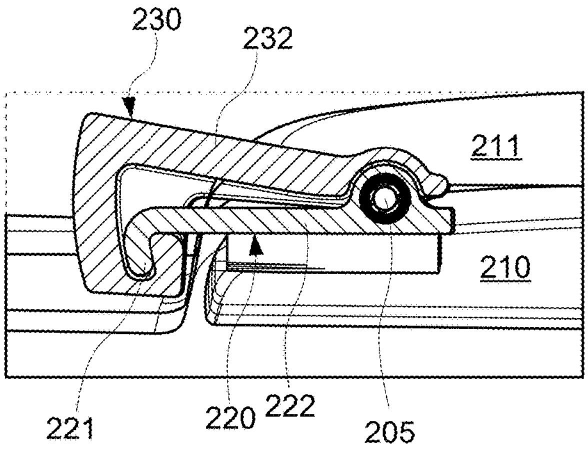

In some embodiments, window 210 may be in the closed position, as illustrated in FIG. 2A. In the closed position, hook 221 extending from main body 222 of latch 220 may be substantially engaged with the recess of latch receiver 230. For example, as shown in FIG. 2B, latch 220 may engage with recess 231 of latch receiver 230 in response to an actuator translation or force (e.g., about hinge axis 205) that rotates main body 222 away from main body 232 of latch receiver 230 and that rotates latch hook 221 toward recess 231.

Figure 2C:
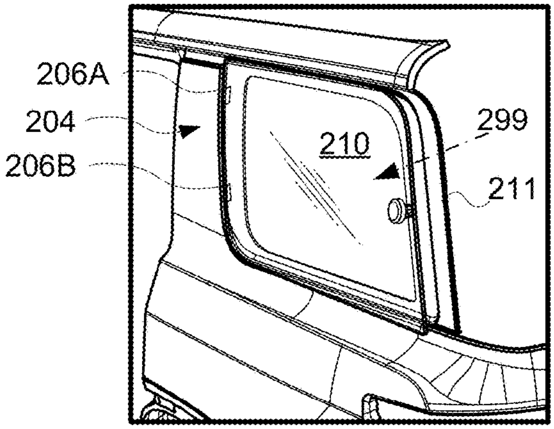
Figure 2D:
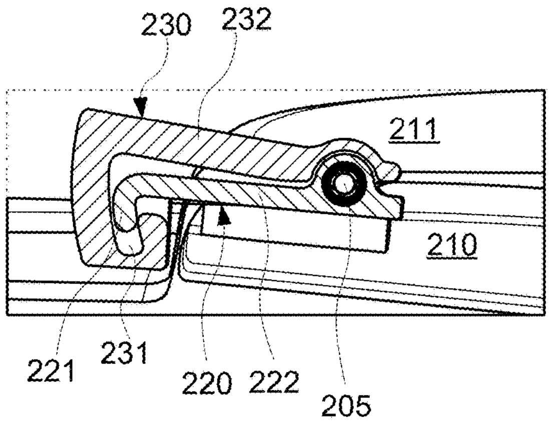

In some embodiments, the window may be in a vented position, as illustrated in FIG. 2C. In the vented position, hook 221 may be partially positioned in recess 231 (e.g., compared to the closed position, the vented position may include main body 222 being rotated less far away from main body 232 and hook 221 being rotated less toward recess 231), as shown in FIG. 2D. In some embodiments, based on the separation distance between the end of hook 221 and the deepest part of recess 231, a corresponding separation may occur between window 210 and support 211. In some embodiments, the separation between window 210 and support 211 may be configured by translating hook 221 particular distances (e.g., based on corresponding actuator commands) with respect to recess 231. For example, a relative angular position of latch 220 and latch receiver 230 about hinge axis 205 may determine the separation may occur between window 210 and support 211 (e.g., separation along direction 299), and may be controllable based on this angular position. As illustrated in FIGS. 2B, 2D, and 2F, the cross sections are views from above looking down at latch assemblies 206A (e.g., latch assembly 206B may be the same), with the exterior of the vehicle at the bottom and the interior at the top. Latch assembly 206A includes latch 220, latch receiver 230, any suitable detents, any other suitable components, or any suitable combination thereof.

Figure 2E:
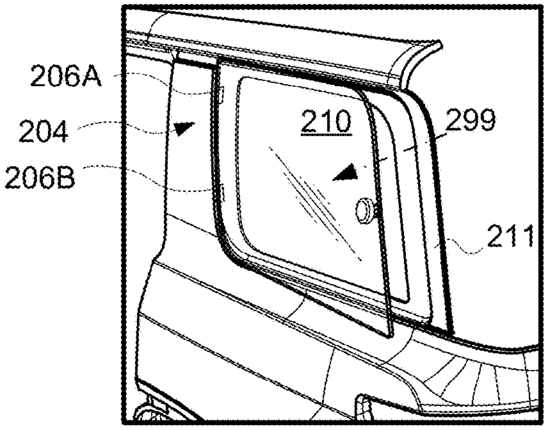
Figure 2F:
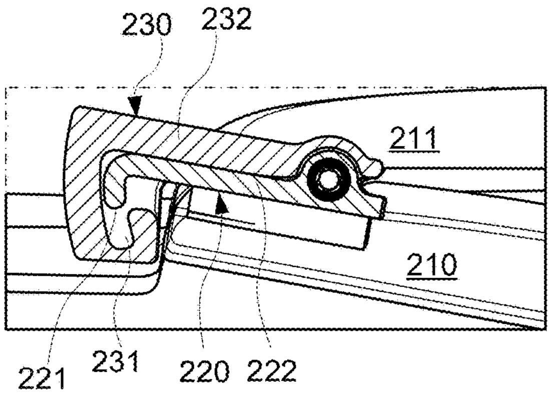

In some embodiments, the window may be in a removable position, as illustrated in FIG. 2E. In the removable position, hook 221 may be positioned outside of recess 231 (e.g., compared to the vented position, the removable position may include main body 222 being rotated less far away from main body 232 and hook 221 being rotated less toward recess 231), as shown in FIG. 2F. For example, in the removable position, main body 222 may be substantially flush with main body 232. Based on hook 221 not being coupled to recess 231, the apparatus (e.g., including latch 220 and latch receiver 230) may be positioned for disassembly, such that after disassembly of the apparatus, window 210 may be fully removed from support 211. For example, by increasing the separation along direction 299, window 210 may transition from the vented state to the removable state. In some embodiments, as illustrated in FIGS. 3A-3D, for example, the apparatus disassembly includes removal of at least one detent feature, the detent feature coupling latch 220 to latch receiver 230 prior to its removal. FIGS. 3A-3D show[[s]] illustrative details of an apparatus including latch 320 and latch receiver 330, the apparatus configured to be readily assembled or disassembled, in accordance with some embodiments of the present disclosure. In an illustrative example, latch 320 and latch receiver 330 may correspond to latch 220 and latch receiver 230 shown in FIGS. 2A-2F. A window and support are not illustrated in FIGS. 3A-3D, merely for purposes of illustration. FIGS. 3A-3D illustrate isometric views of the apparatus in various configurations (e.g., both assembled and disassembled).

FIG. 3D illustrates an exploded view and assembled view of latch 320 (e.g., without detents assembled in latch 320 and with detents assembled in latch 320, respectively). In some embodiments, latch 320 includes two cavities (e.g., cavities 325 and 326), each with a respective edge (e.g., edges 327 and 328) and a respective volume (e.g., volume 329 includes both) for holding a respective ball detent (e.g., ball detents 345 and 346, which may be spring-loaded). For example, detent 345 may be configured to reside in cavity 325 of latch 320, and ball detent 346 may be configured to reside in cavity 326 of latch 320, opposite cavity 325. In some embodiments, cavities 325 and 326 may be first and second regions of a through-hole of latch 320 (e.g., defining volume 329). In some embodiments, ball detents 345 and 346 may have lips, ridges, extensions, or other features that extend beyond a diameter of edges 327 and 328, such that ball detents 345 and 346 are configured to occupy a particular position within respective cavities 325 and 326 (e.g., or respective portions of a single cavity such as a through hole defining volume 329). In some embodiments, the length of each of cavities 325 and 326 and the length of respective ball detents 345 and 346 are oriented coaxially with hinge axis 305.

The progression from FIG. 3A to FIG. 3B to FIG. 3C, may correspond to disassembling the apparatus (e.g., for removing a window from a window support, where both the window and the support may be coupled to respective elements of the apparatus). For example, as illustrated in FIG. 3A, latch 320 is coupled to latch receiver 330, capable of rotating about hinge axis 305. In this coupled state, ball detents 345 and 346 may respectively reside in cavities 325 and 326 of latch 320. For example, respective balls 355 and 356 of ball detents 345 and 346 may respectively occupy first and second detent recesses 357 and 358 (e.g., ball-shaped recesses) in latch receiver 330. In some embodiments, detent recesses 357 and 358 include holes in latch receiver 330. In some embodiments, detent recesses 357 and 358 are configured such that an inner surface of the recess couples to the top of the balls of the ball detent (ball detent 345 or 346). While ball detents 345 and 346 are shown as being spring-loaded, this is merely illustrative, and other mechanisms for loading and unloading a ball detent may be used in accordance with the present disclosure.

In some embodiments, as shown in FIG. 3B, latch 320 may be partially removed from latch receiver 330. In this partially removed state, ball detents 345 and 346 may be decoupled from latch receiver 330 (e.g., by compressing one or more ball detent springs 365 and 366, such that ball detents 345 and 346 decouple from corresponding detent recesses 357 and 358). In some embodiments, when one or more ball detents (e.g., ball detents 345 and 346) are decoupled from corresponding detent recesses (e.g., detent recesses 357 and 358), the cavity of latch 320 (e.g., centered about axis 306) may be rotated off of hinge axis 305. In some embodiments, not illustrated in FIGS. 3A-3D, a latch or latch receiver may include integrated detent features (e.g., ball detents) that are formed as part of the component. For example, a latch, latch receiver, or both may include a ball detent or mating indentation and a flexible/deformable portion that allows the ball detent or mating indentation to flex to fit in to position and then remain in position by spring forces in the material (e.g., arising from deformation). Accordingly, in some embodiments, springs 365 and 366 may be integrated into a latch or latch receiver, and may include a relatively thin portion of material having a lessened stiffness to deflection such that it acts as a spring (e.g., a beam spring, a coil spring, a torsion spring, or any other suitable type of spring that may be formed as part of a single piece of material) and may move in response to forces on the material (e.g., a plastic material).

In some embodiments, as shown in FIG. 3C, latch 320 is removed from latch receiver 330. In some embodiments, after the cavity of latch 320 (e.g., defining volume 329) is rotated off of hinge axis 305, hook 321 (e.g., similar to hook 221 of FIG. 2) may be fully removed from recess 331 (e.g., similar to recess 231 of FIG. 2) and the proximate area, such that latch 320 and latch receiver 330 may be fully decoupled (e.g., as the window is removed from the support). In some embodiments, though not explicitly shown in FIG. 3C, removing hook 321 from recess 331 may permit or correspond to removing the window (e.g., where latch 320 may be coupled to the window) from the window support (e.g., where latch receiver 330 may be coupled to the window support).

FIGS. 4A-4D show illustrative details of an interface between latch 420 and latch receiver 430, in accordance with some embodiments of the present disclosure. In some embodiments, latch receiver 430 includes protrusion 471 and latch 420 includes recess 491, where protrusion 471 is configured to couple to recess 491 (e.g., engage and disengage with). For example, FIG. 4A corresponds to a closed window position, where window 410 may be sealed against 411. In the closed position, the interface (e.g., including interface 401 of protrusion 471 and recess 491) may tightly secure latch 420 to latch receiver 430 (e.g., such that they are not easily separated). In some embodiments, latch 420 is coupled to window 410 and latch receiver 430 is coupled to a window support (e.g., support 411), such that the tight coupling of the interface tightly secures window 410 to support 411 such that window 410 is not removable when closed (e.g., which may include a frame or at least one pillar of a vehicle). To illustrate, protrusion 471 may include a lip and recess 491 may include an open slot into which the lip fits (e.g., each extending along the axis 405 of pivot 406).

Figure 4B:
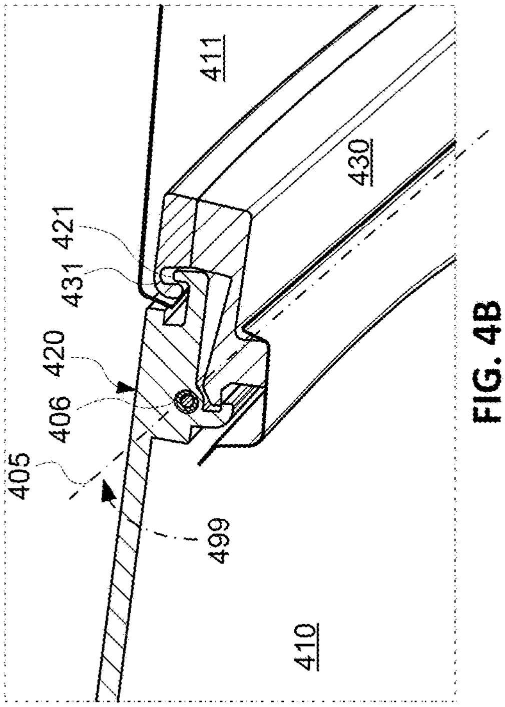
FIGS. 4A-4D show illustrative depictions of a configurable interface including a window, a support, and a latch apparatus, in accordance with some embodiments of the present disclosure.

In some embodiments, FIG. 4B illustrates a vented window position. In the vented position, while hook 421 may be rotated partially away from recess 431 and main body 422 may be rotated partially toward main body 432 (e.g., about pivot 406, in direction 499), protrusion 471 may remain coupled to recess 491, such that interface 401 continues to tightly secure latch 420 to latch receiver 430 such that they are not detachable from each other. For example, as illustrated in FIG. 4B, window 410 may be partially opened to permit air flow into the vehicle while leaving only a small gap between window 410 and support 411.

Figure 4D:
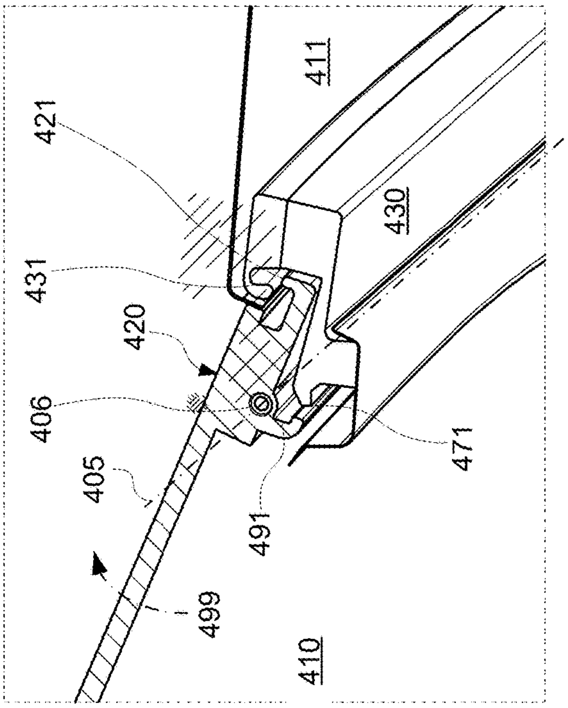
Figure 4A:
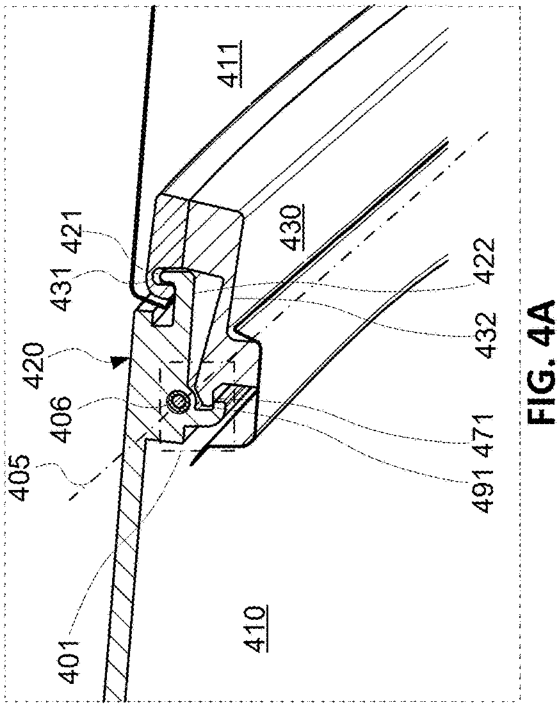
Figure 4C:
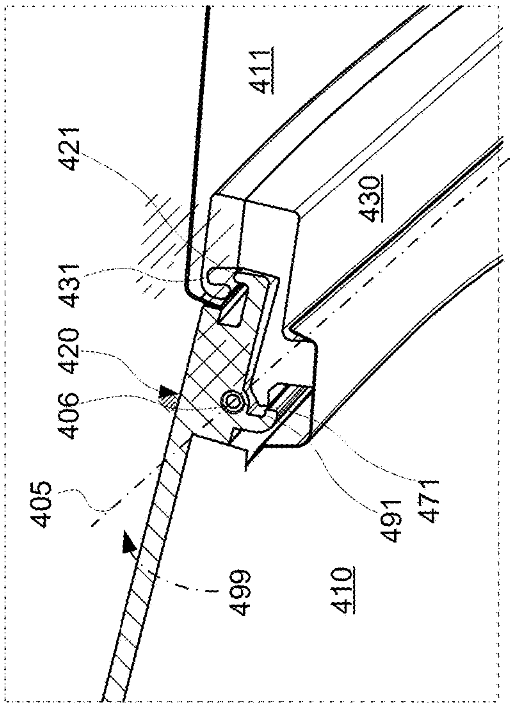

FIG. 4C illustrates a removable window position. In the removable position, because hook 421 may be rotated entirely away from recess 431 and main body 422 may be rotated entirely toward main body 432 (e.g., about pivot 406, in direction 499), protrusion 471 may be decoupled from recess 491, such that interface 401 no longer secures latch 420 to latch receiver 430 (e.g., they can be detached). For example, as illustrated in FIG. 4C, a manipulator of latch 420 (e.g., an owner or mechanic of a vehicle including the latch, or an actuator configured to operate the latch assembly) may be able to fully detach latch 420 from latch receiver 430 and therefore detach window 410 from support 411.

FIG. 4D illustrates a detached window position. In the detached position, because interface 401 no longer secures latch 420 to latch receiver 430, latch 420 may be fully decoupled from latch receiver 430, therefore decoupling window 410 from support 411. Interface 401 is disrupted, as protrusion 471 is removed from recess 491. Decoupled window 410 may be fully detached from support 411. To reattach detached window 410, the manipulator of latch 420 may simply insert window 410 such that recess 491 is again coupled to protrusion 471. As illustrated in FIG. 4D, in the detached state, the features of latch 420 are clear from features of latch receiver 430 such that latch 420 may be translated away from latch receiver 430 (e.g., as window 410 is removed from a vehicle, away from support 411).

Figure 5A:
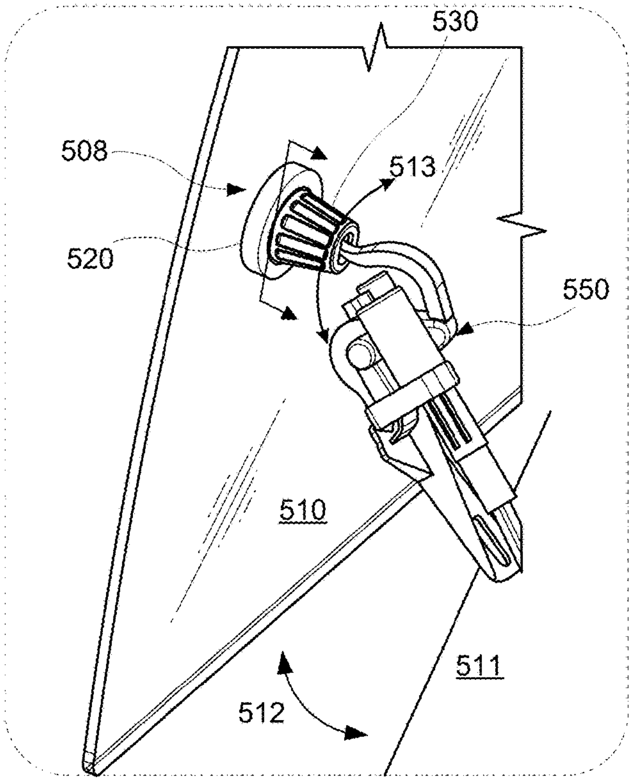
FIGS. 5A-5D show illustrative depictions of a window disconnect, in accordance with some embodiments of the present disclosure.
Figure 5B:
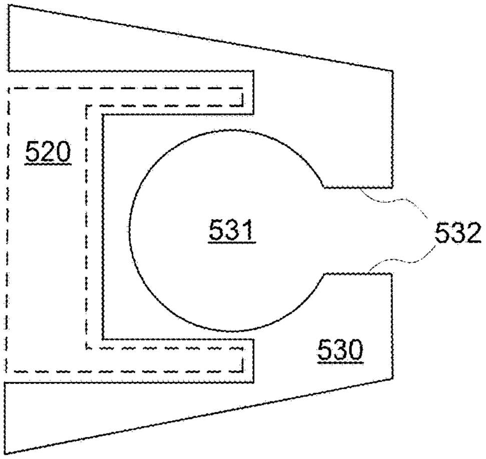
Figure 5C:
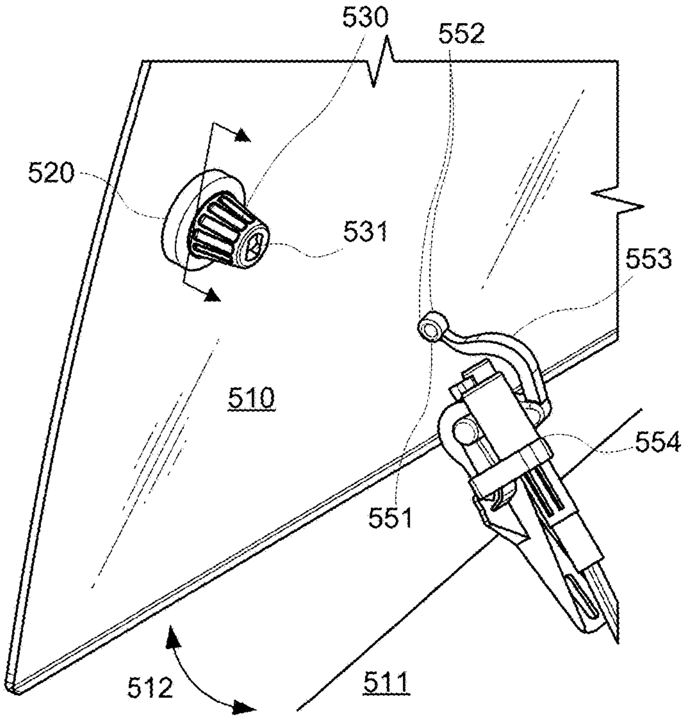

FIGS. 5A-5D show illustrative details of window disconnect 508 (e.g., which may correspond to the window disconnect of FIG. 1) and arm device 550 that is configured to be coupled to or decoupled from the window disconnect, in accordance with some embodiments of the present disclosure. FIG. 5A corresponds to a closed configuration of window disconnect 508 (e.g., the closed or vented window positions) and FIG. 5C corresponds to an open position of window disconnect 508 (e.g., the removable window position). As shown in FIGS. 5A and 5C, window disconnect 508 includes base 520 that is coupled to window 510 and collar 530 that is configured to rotate around base [[521]] 520. In some embodiments, arm device 550 includes keyed ball 551 (e.g., a keyed ball may be generally spherical but have flats on opposite sides) configured to engage with and rotate, or otherwise interface with, collar 530 (e.g., based on coupling of keyed ball 551 to keyed socket 531 of collar 530). For example, keyed ball 551 of arm device 550 may be inserted into keyed socket 531 and rotated 80, 85, 90, 95, or 100 degrees (or any other suitable degree of rotation). In some embodiments, a first direction of the rotation (e.g., clockwise or counter clockwise, as indicated by direction 513) may adjust keyed socket 531 from the open to the closed position, and a second direction of the rotation, opposite the first direction, may adjust keyed socket 531 from the closed position to the open position. Keyed socket 531 may correspond to a recess shaped similarly as keyed ball 551, such that relative axial displacement is only possible at some relative angles (e.g., when flats 552 line up with flats 532). Although illustrated as being exposed (e.g., visible from the vehicle interior) in FIGS. 5A and 5B, arm device 550 (e.g., including keyed ball 551) may reside within a vehicle frame, a window support structure, or a vehicle pillar (e.g., a C pillar, D pillar, or any other suitable pillar). In some embodiments, arm device 550 includes actuator assembly 554, which may include an electromagnetic motor, circuitry, connectors, any other suitable components, or any combination thereof.

Figure 5D:
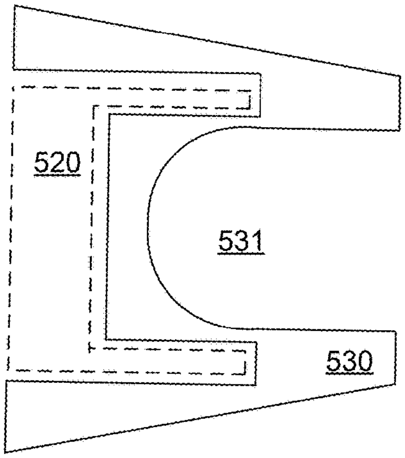

As illustrated in FIGS. 5B and 5D, a geometry of keyed socket 531 may be affected by the rotation of collar 530 and may thereby cause window disconnect 508 to be in the open or closed position. For example, in the closed configuration, keyed socket 531 may have a narrow (e.g., less wide than a diameter of keyed ball 551) throat that prevents window 510 from being removed, whereas in the opened configuration, keyed socket 531 may have a wide (e.g., greater than or equal to the diameter of keyed ball 551) throat that permits window 510 to be removed (e.g., from support 511, as illustrated FIGS. 5A and 5C). Space 512 is increased when window 510 is removed from support 511, relative to the closed position of window disconnect 508. Any space between in window 510 and support 511 may be negligible (e.g., they may be sealed against each other) in the closed state, but may be any suitable value in a vented state (e.g., as shown in FIG. 5A) or a removed state (e.g., as shown in FIG. 5C). In some embodiments, keyed ball 551 remains in keyed socket 531 in the closed and vented window positions (e.g., with window 510 thereby mounted to the vehicle via arm 553 connected to keyed ball 551), and keyed ball 551 remains outside of keyed socket 531 in the removable position (e.g., with window 510 thereby not mounted to the vehicle via arm 553). In some embodiments, when window disconnect 508 is in the open position, window 510 is in the removable position and may be detached from support 511.

Figure 6:
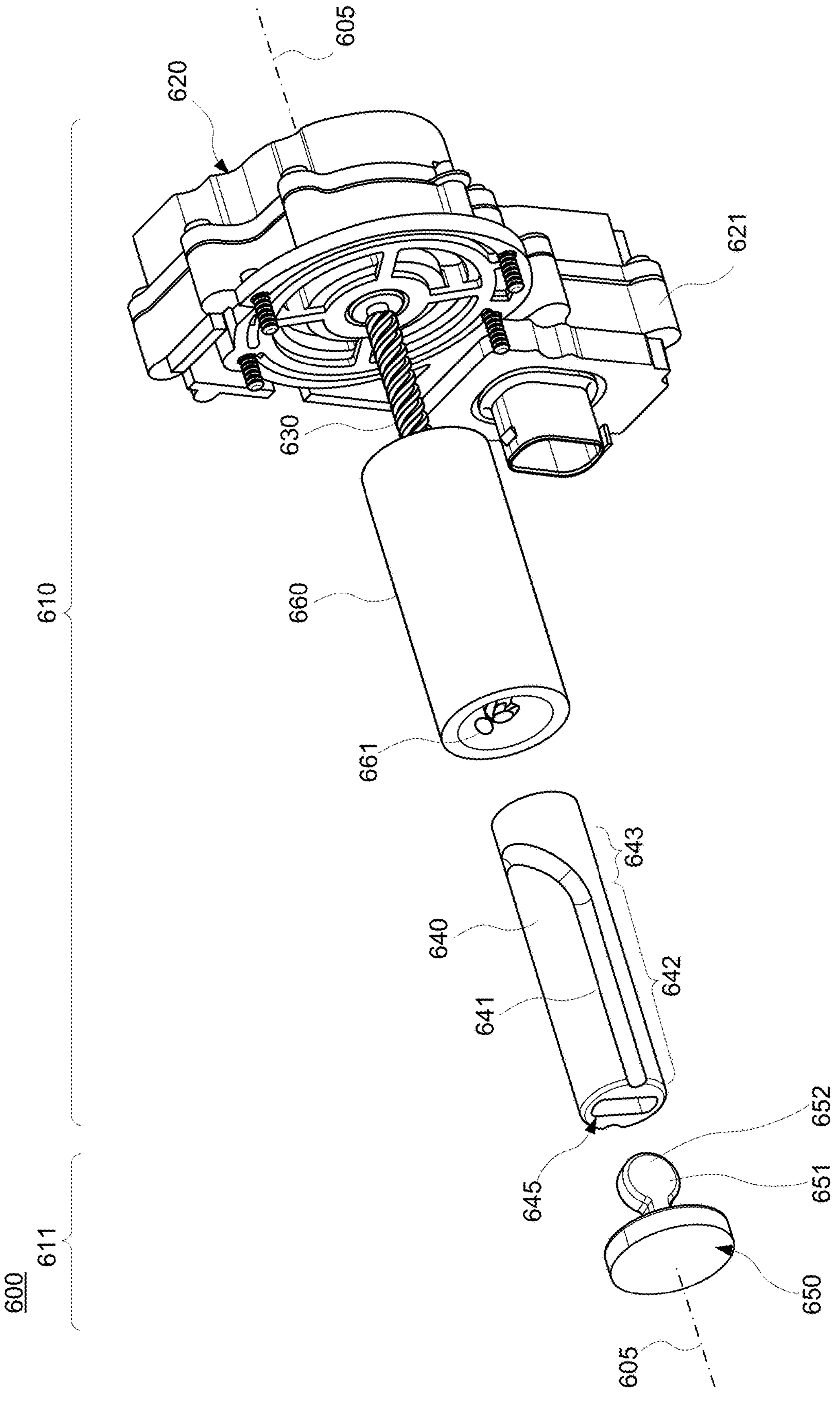
FIG. 6 shows a perspective, exploded view of the illustrative linear actuator of FIG. 6 having multiple modes of translation, in accordance with some embodiments of the present disclosure.

FIG. 6 shows a perspective, exploded view of illustrative linear actuator 610 having multiple modes of translation, in accordance with some embodiments of the present disclosure. In some embodiments, a suitable system, assembly, architecture, apparatus, or mechanical structure for actuating a window includes linear actuator 610 (e.g., which may be coupled to a window support) and ball joint element 650 (e.g., which may be coupled to a window). In some embodiments, linear actuator 610 includes translation screw 630 (e.g., which is driven by motor assembly 620, which may include motor, gear box, and circuitry 621), translation shaft 640 coupled to translation screw 630, and housing 660 coupled to translation shaft 640. For example, a concentric arrangement of linear actuator 610 may include, from inside to outside, translation screw 630, translation shaft 640, and housing 660. In some embodiments, translation screw 630 may also include a leadscrew or power screw. In some embodiments, translation shaft 640 includes threading (e.g., with suitable female threads configured to engage with the threading of translation screw 630) on the interior of the shaft, such that the inside of translation shaft 640 may couple to the outside of translation screw 630. In some embodiments, the outside of translation shaft 640 includes groove 641 and the inside of housing 660 includes boss 661, such that the outside of translation shaft 640 may couple to the inside of housing 660 via boss 661 being inserted into or traversing groove 641. In some embodiments, housing 660 controls the rotational orientation of translation shaft 640 based on how boss 661 traverses corresponding groove 641 (e.g., the rotational orientation of translation shaft 640 may depend on the axial position of translation shaft 640, as controlled by translation screw 630).

In some embodiments, linear actuator 610 couples to a window (or to another surface that is manipulated by the linear actuator) via element 611 of the window or window assembly (e.g., element 611 may include ball joint element 650). For example, ball joint element 650 (e.g., with keyed ball 651 having opposed flat faces 652 connected by a curved edge) may be coupled to the window, and translation shaft 640 may include ball joint element 645 (e.g., including a keyed socket having a slotted opening) configured to couple to ball joint element 650. For example, the interface may be defined by a first ball joint element (e.g., ball joint element 650) and a second ball joint element (e.g., ball joint element 645), which are configured to engage and disengage with each other. Based on translation shaft 640 being coupled to ball joint element 650 (e.g., via the keyed socket) and translation screw 630 (e.g., via the internal female threading), and ball joint element 650 being coupled to the window (e.g., via an adhesive), the window may push out or pop out in response to linear actuator 610 driving out translation shaft 640 based on rotation of translation screw 630.

In some embodiments, linear actuator 610 and translation screw 630 are configured for at least three states and two ranges of motion (e.g., where the first range of motion transitions between the first and second states, and the second range of motion transitions between the second and third states). In some embodiments, a first state of linear actuator 610 and translation screw 630 (e.g., in which translation screw 630 is most proximate to the motor driving translation screw 630) corresponds to a closed position of a window. In some embodiments, linear actuator 610 drives translation shaft 640 to extend away from the motor (e.g., via rotation of translation screw 630) through the first range of motion with a substantially constant rotational orientation. For example, translation screw 630 may drive translation shaft 640 outward, without rotating translation shaft 640 (e.g., about axis 605). In some embodiments, groove 641 of translation shaft 640 is oriented substantially parallel to the length of translation screw 630 (e.g., along axis 605) though the first range of motion, such that a mating (e.g., fitting together at an interface) between groove 641 of translation shaft 640 and boss 661 of housing 660 maintains translation shaft 640 at the substantially constant rotational orientation (e.g., boss 661 traverses linear portion 642 of the groove 641). Because of the substantially constant rotational orientation in the first range of motion, the movement of translation shaft 640 may maintain ball joint element 645 (e.g., a keyed socket of translation shaft 640) in a locked configuration relative to ball joint element 650 (e.g., keyed ball 651 thereof). In some embodiments, a second state of translation shaft 640 (e.g., corresponding to the vented position of the window) corresponds to one or more positions within or at the outermost (e.g., with respect to the actuator motor of motor assembly 620) portion of the first range of motion. For example, the one or more positions of the second state of translation shaft 640 may correspond to a configurable separation distance between the window and the window support.

In some embodiments, a third state of translation shaft 640 corresponds to a removable position of the window. In some embodiments, through the second range of motion, linear actuator 610 drives translation shaft 640 to extend away from the motor with a varying rotational orientation (e.g., via translation screw 630). In other words, translation screw 630 may drive translation shaft 640 outward (e.g., with respect to the actuator motor of motor assembly 620) while rotating translation shaft 640. For example, during the second range of motion, translation shaft 640 may rotate at least 80 degrees (e.g., 80, 85, 90, 95, or 100 degrees, or any other suitable degree of rotation). In some embodiments, the second range of motion drives translation shaft 640 such that curved portion 643 of groove 641 is mated with boss 661. Boss 661 causes rotation of translation shaft 640 (e.g., boss 661 traverses curved portion 643 of groove 641). Because of the resulting varying rotational orientation during the second range of motion, the movement of translation shaft 640 may rotate ball joint element 645 (e.g., the keyed socket of translation shaft 640) about axis 605 into an unlocked configuration relative to ball joint element 650 (e.g., keyed ball 651 may be removable from the keyed socket of ball joint element 645). To illustrate, ball joint element 645 may include a keyed socket having a spherical recess with flats to correspond to a spherical shape of keyed ball 651 having flat faces 652.

Figure 7A:
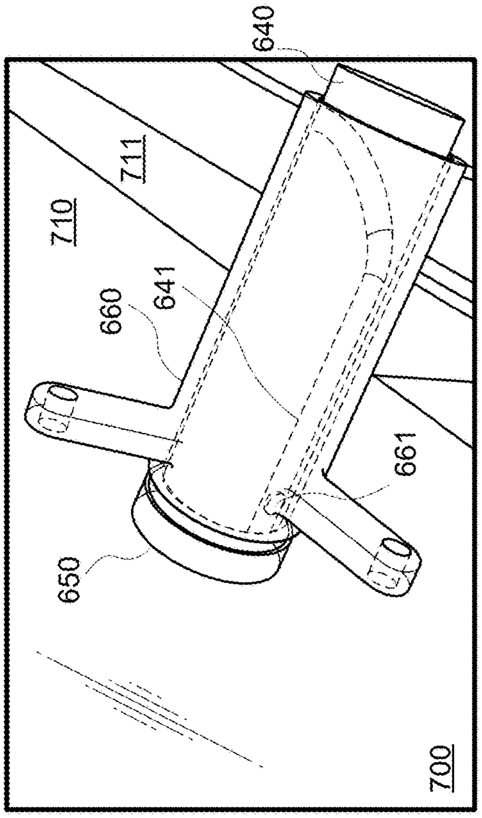
FIGS. 7A-7D show illustrative depictions of multiple modes of translation of the illustrative linear actuator of FIG. 6, in accordance with some embodiments of the present disclosure.
Figure 7B:
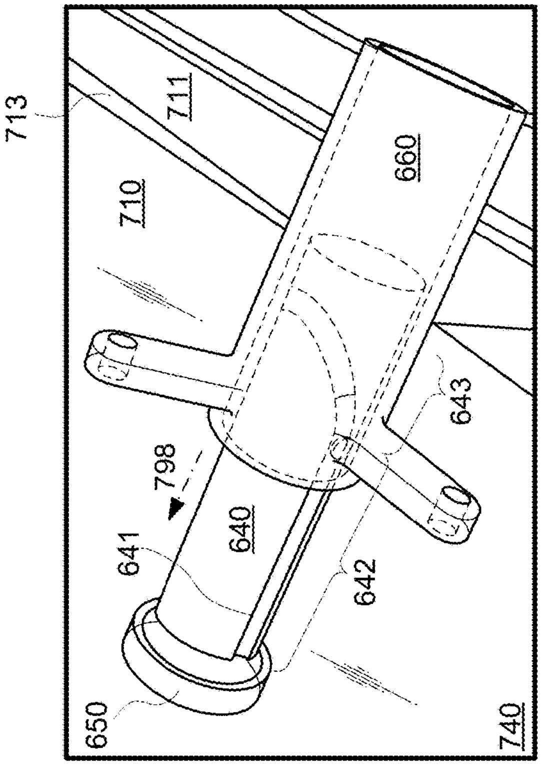
Figure 7C:
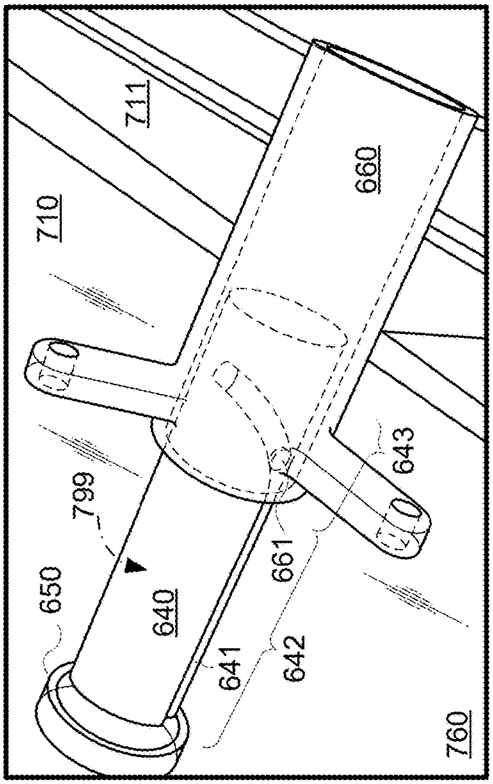
Figure 7D:
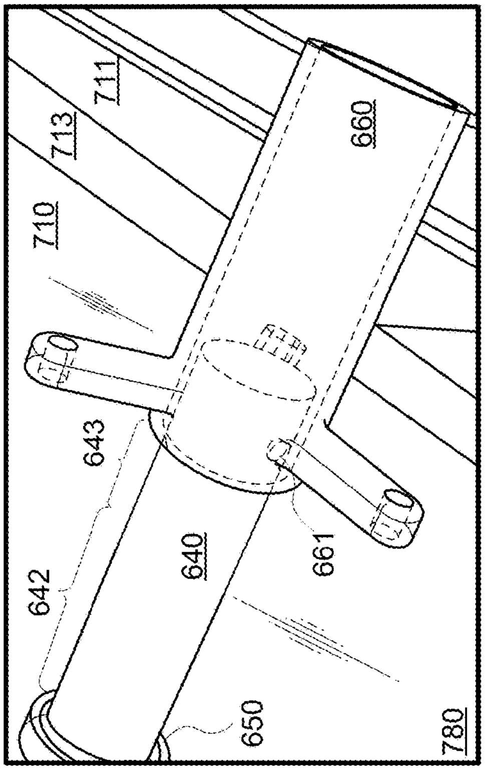

FIGS. 7A-7D show illustrative depictions of multiple modes of translation of linear actuator 610 of FIG. 6, in accordance with some embodiments of the present disclosure. As mentioned above, linear actuator 610 may be configured for a first range of motion (e.g., translation without rotation), as shown in FIGS. 7A and 7B; linear actuator 610 may also be configured for a second range of motion (e.g., translation with rotation), as shown in FIGS. 7C and 7D. In some embodiments, FIGS. 7A-7D respectively illustrate closed, venting, venting, and removable window positions (e.g., as boss 661 traverses groove 641). As illustrated in FIGS. 7A and 7B (e.g., closed to vented configurations), translation shaft 640 may move through some or substantially all of linear portion 642 of groove 641, along direction 798. In the vented position, window 710 is separated by space 713 from support 711. As illustrated in FIG. 7C, translation shaft 640 has moved through at least part of curved portion 643 of groove 641, rotating along direction 799. As illustrated in FIG. 7D, translation shaft 640 has moved through substantially all of curved portion 643 of groove 641 (e.g., leaving space 713 between window 710 and support 711). As shown in the sequence of FIGS. 7A-7D, the outward movement of translation shaft 640 causes a corresponding outward movement of window 710 from support 711 (e.g., from a closed position to a vented position and then to a removal position).

Figure 8A:
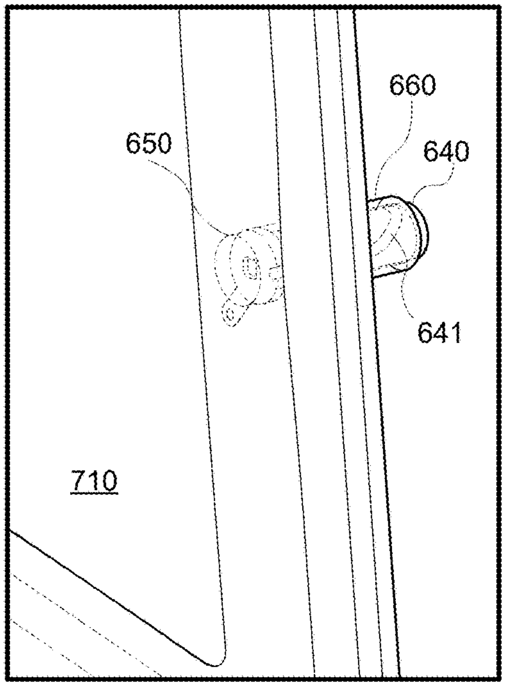
FIGS. 8A-8D show illustrative depictions of configurable window positions based on positions of the illustrative linear actuator of FIG. 6, in accordance with some embodiments of the present disclosure.
Figure 8B:
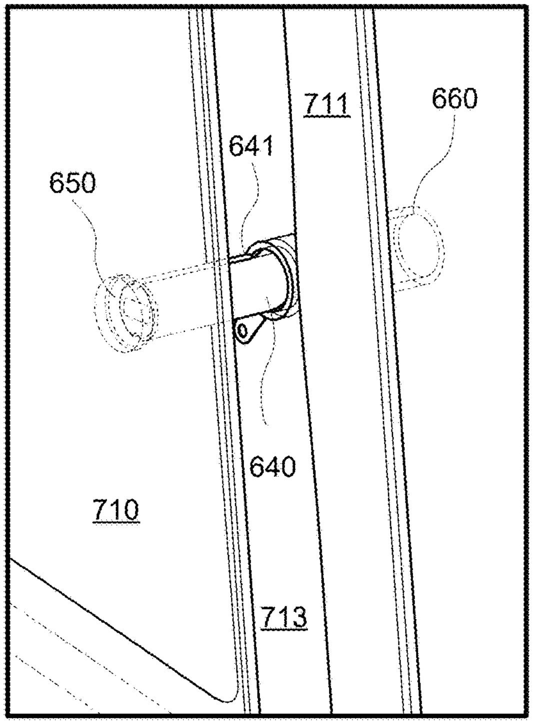
Figure 8C:
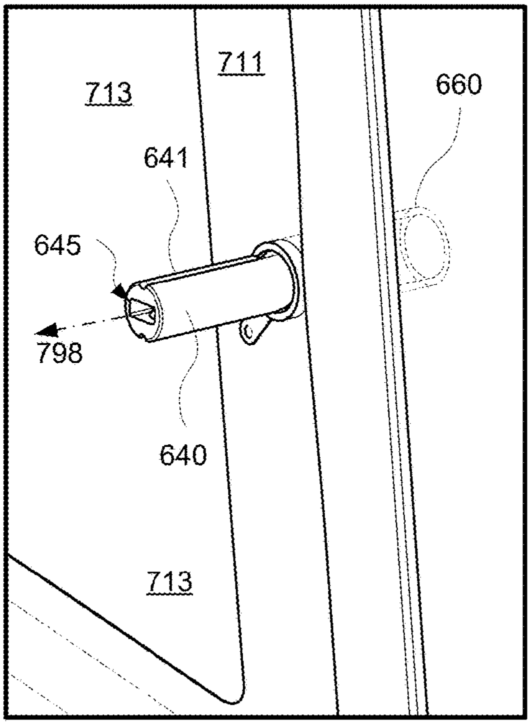
Figure 8D:
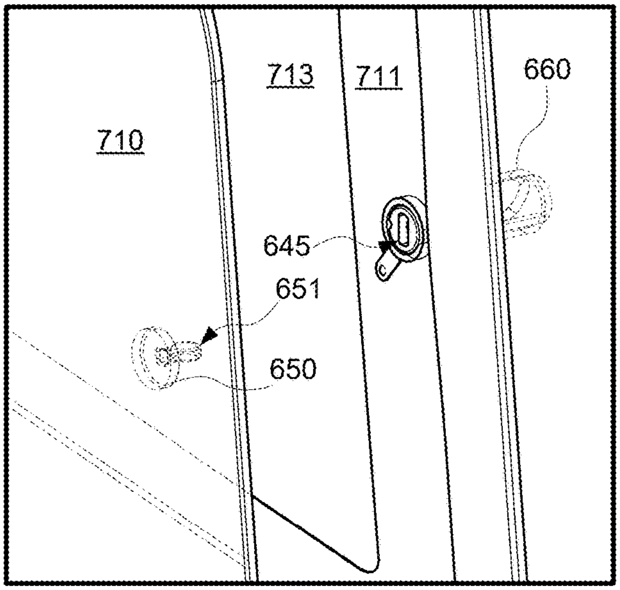

FIGS. 8A-8D show illustrative depictions of configurable window positions based on positions of linear actuator 610 of FIG. 6, in accordance with some embodiments of the present disclosure. FIGS. 8A-8D illustrate window 710 as viewed from outside the vehicle (e.g., the vehicle interior is directly visible only through space 713 or otherwise through window 710). As illustrated in FIG. 8A, window 710 may be in the closed position when translation shaft 640 is not substantially extended from housing 660. In this closed position, window 710 may be mated (e.g., via suitable mating features) or otherwise coupled to support 711 (e.g., forming an airtight seal). As illustrated in FIG. 8B, window 710 may be in the vented position when translation shaft 640 has extended from housing 660 with a substantially constant rotational orientation. In this vented position, window 710 may be at least partially separated from support 711 (e.g., to permit airflow). As illustrated in FIG. 8C, window 710 may be in the removable position when translation shaft 640 has further extended from housing 660 with a varying rotational orientation. In FIG. 8C, window 710 is shown as being removed from support 711 (e.g., window 710 is not visible). In FIG. 8D, translation shaft 640 is shown as being retracted back into housing 660 despite not being recoupled or refastened to window 710. In some embodiments, to reattach window 710 to the support 711, keyed ball 651 of ball joint element 650 is inserted into the keyed socket of ball joint element 645. In some embodiments, based on the variable rotational orientation of the keyed socket of ball joint element 645 (e.g., based on at least the two rotational orientation states shown in FIGS. 8C and 8D), keyed ball 651 may be inserted into the keyed socket of ball joint element 645 when translator shaft 640 is in the fully extended position, and keyed ball 651 may not be inserted into the keyed socket of ball joint element 645 when translator shaft 640 is in the retracted position. For example, in the retracted position, the keyed socket of ball joint element 645 may have a rotational orientation such that the fastening orientations are mismatched between the keyed socket of ball joint element 645 and the keyed ball 651. To illustrate, in the retracted position, the keyed socket may be oriented vertically, while in the extended position, the keyed socket may be oriented horizontal (e.g., or any other suitable set of retracted and extended positions).

Figure 9C:
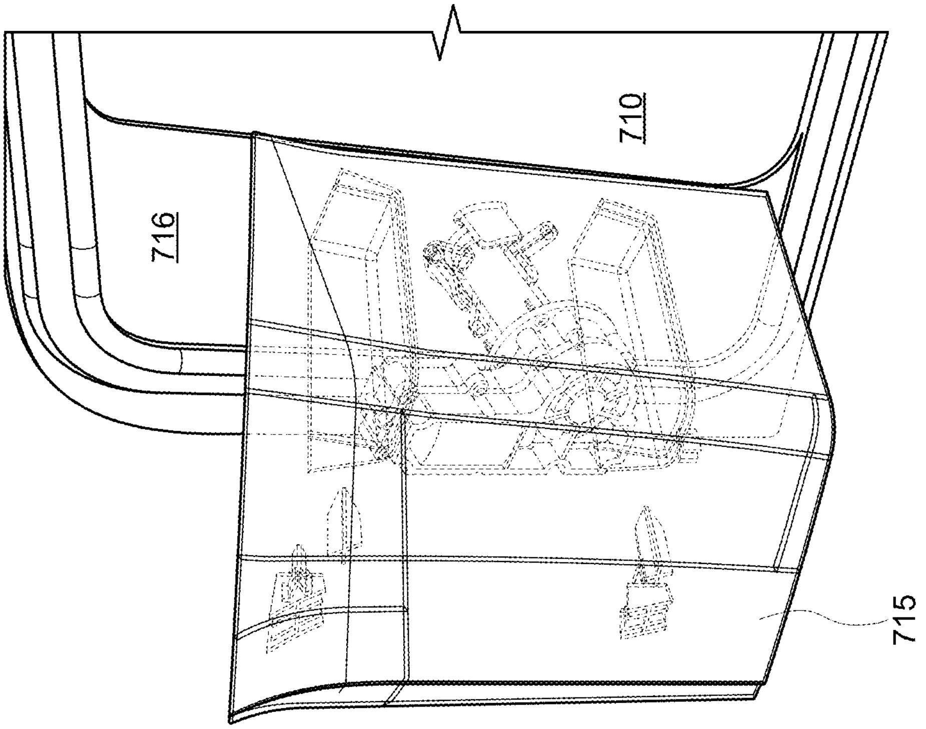
FIGS. 9A-9C show multiple views of an illustrative vehicle window including a ball joint element and the illustrative linear actuator of FIG. 6, in accordance with some embodiments of the present disclosure.
Figure 9B:
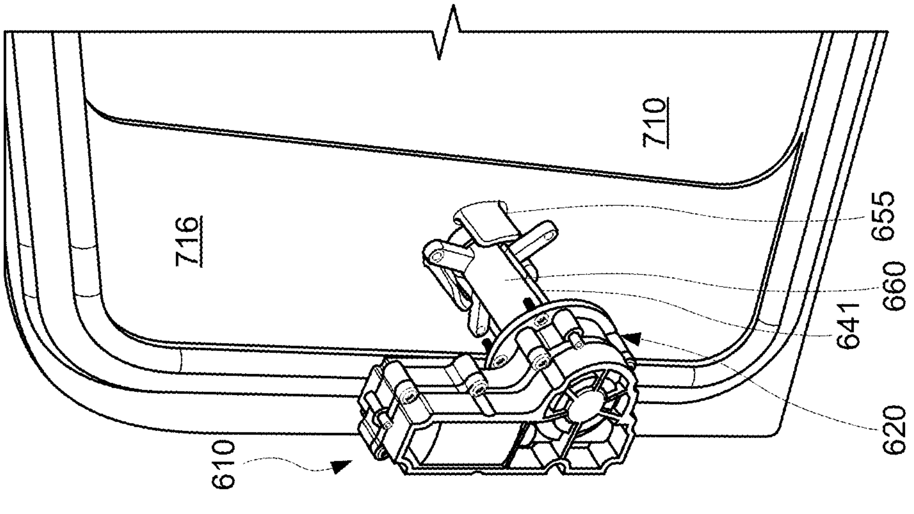
Figure 9A:
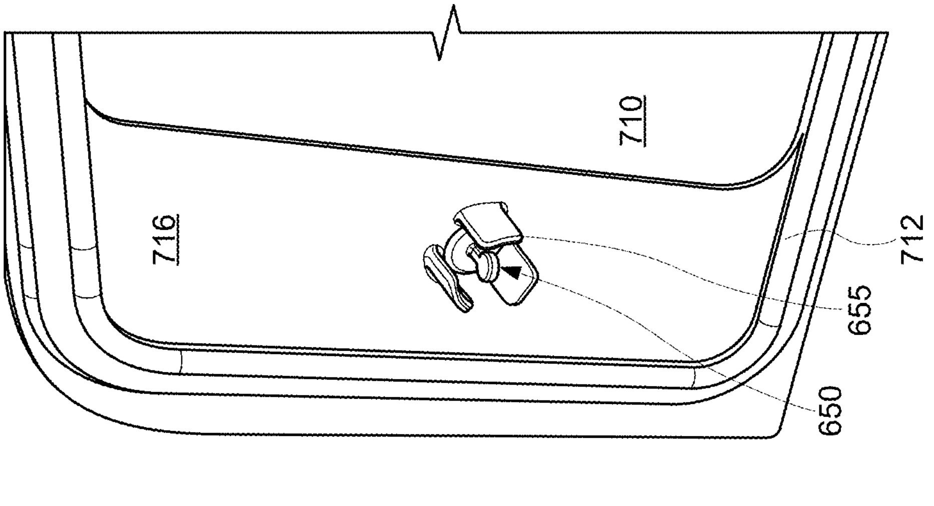

FIGS. 9A-9C show multiple views of an illustrative vehicle window and an illustrative vehicle window support including ball joint element 650 and linear actuator 610 of FIG. 6, in accordance with some embodiments of the present disclosure. For example, support 711 may be a D pillar or a C pillar of a vehicle frame, or another aspect of the vehicle frame, although integration with other pillars and supports is also contemplated and suitable for use with the teachings provided herein. In some embodiments, the progression of FIGS. 9A-9C may correspond to a manufacturing flow of a vehicle or system to incorporate an apparatus into the vehicle, consistent with the present disclosure.

Figure 12:
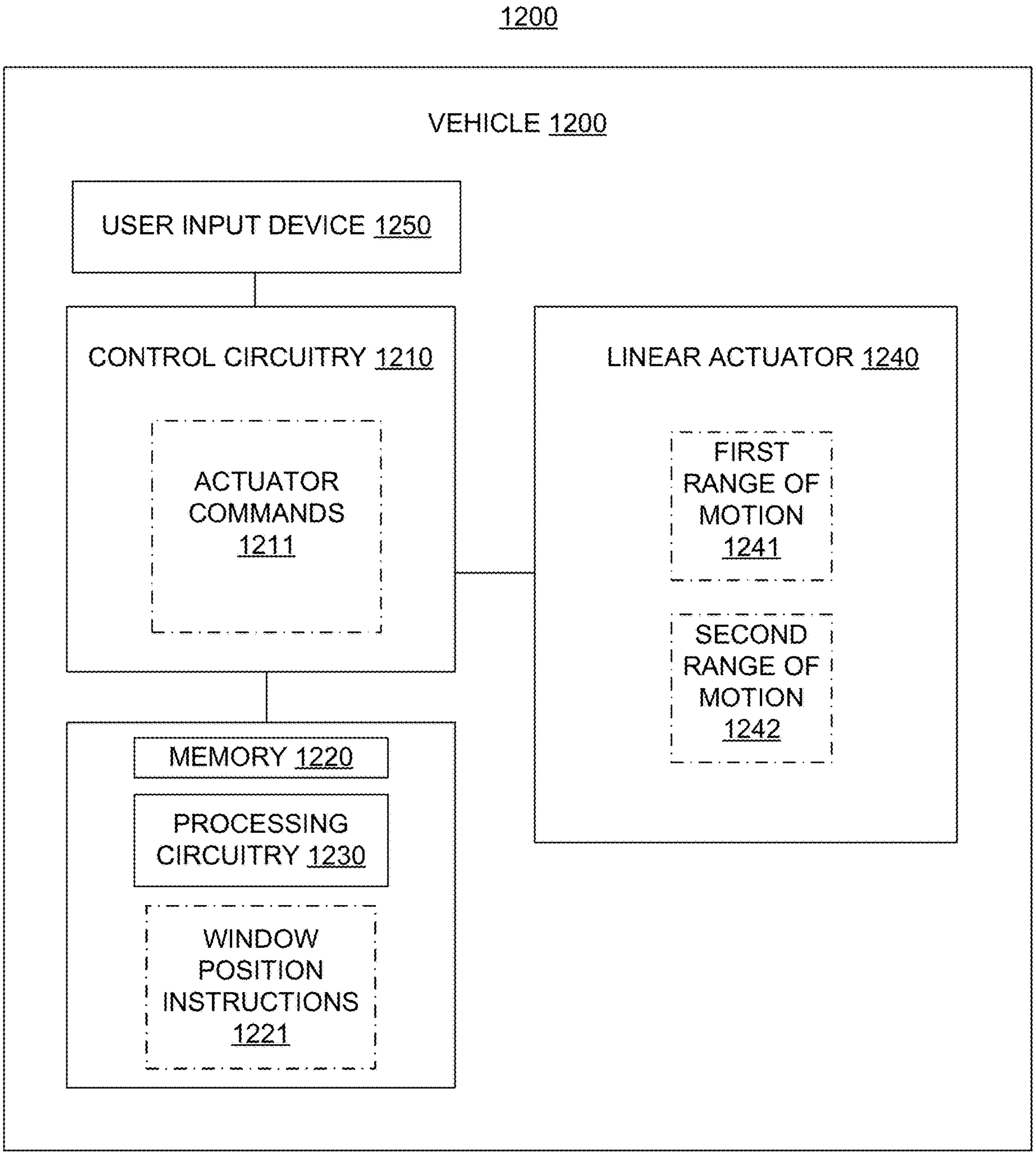
FIG. 12 is an illustrative block diagram of a vehicle including a linear actuator and corresponding control circuitry and memory and processing circuitry, in accordance with some embodiments of the present disclosure.

As illustrated in FIG. 9A, the apparatus includes window 710, support 711, bulb seal 712 (e.g., to realize an airtight interface between window 710 and support 711), and ball joint element 650. As illustrated, window 710 includes region 716 at which ball joint element 650 is arranged and attached. For example, region 716 may be transparent, translucent or tinted, or opaque, and may be the same or different material from the rest of window 710 (e.g., part of a frame of window 710). In some embodiments, ball joint element 650 is surrounded by brackets 655 to support, or otherwise interface with, housing 715 (e.g., which may be part of, or integrated with, a pillar of the vehicle), any other suitable component, or any combination thereof. As illustrated in FIG. 9B, linear actuator 610 and housing 715 are added to the apparatus. As illustrated, housing 715 is coupled to linear actuator 610 and coupled to brackets 655 surrounding ball joint element 650. In some embodiments (e.g., as shown in FIG. 6), linear actuator 610 includes motor assembly 620 configured to drive translation screw 630 and includes translation shaft 640 coupled to translation screw 630 via mating threads, where translation shaft 640 and translation screw 630 reside within housing 660. As similarly illustrated in [[FIGS. 6-8]] FIGS. 6, 8A-8D, and 9A-9C, linear actuator 610 may be configured to push window 710 away from support 711 (e.g., into the venting position or the removal position) based on driving translation shaft 640 away from the body of linear actuator 610. As illustrated in FIG. 9C, linear actuator 610 may be concealed inside a D pillar or other suitable element of a vehicle frame. In some embodiments, an input interface associated with the vehicle may provide an actuation mechanism (e.g., a button on the vehicle, an option on a vehicle console, touch screen, or other haptic input system, a selection on a mobile application coupled to the vehicle, an input on a key or key fob coupled to the vehicle, any other suitable actuation mechanism, or any combination thereof). In some embodiments, the input interface may include an audio receiver (e.g., a microphone) and may be configured to receive voice commands issued by a user (e.g., control circuitry may be configured to perform voice recognition, speech recognition, or both to identify commands spoken by a user and received at the audio interface). In some embodiments a user input may be received at the input interface, as illustrated in FIG. 12, and the system may be configured to command linear actuator 610 (e.g., by generating one or more motor commands) to adjust window 710 into one of at least three predetermined positions (e.g., the closed, vented, and removable positions). The command may be generated by circuitry 621, or generated by control circuitry and transmitted to circuitry 621, which may include a motor controller. In some embodiments, for example, the command may be generated automatically based on at least one other signal such as a temperature (e.g., of an occupant compartment or a zone thereof, or an ambient temperature), a speed of the vehicle, a locked/unlocked state of the vehicle, a climate control signal (e.g., based on a user setting), any other suitable signal, any other suitable criteria, or any combination thereof.

Figure 10:
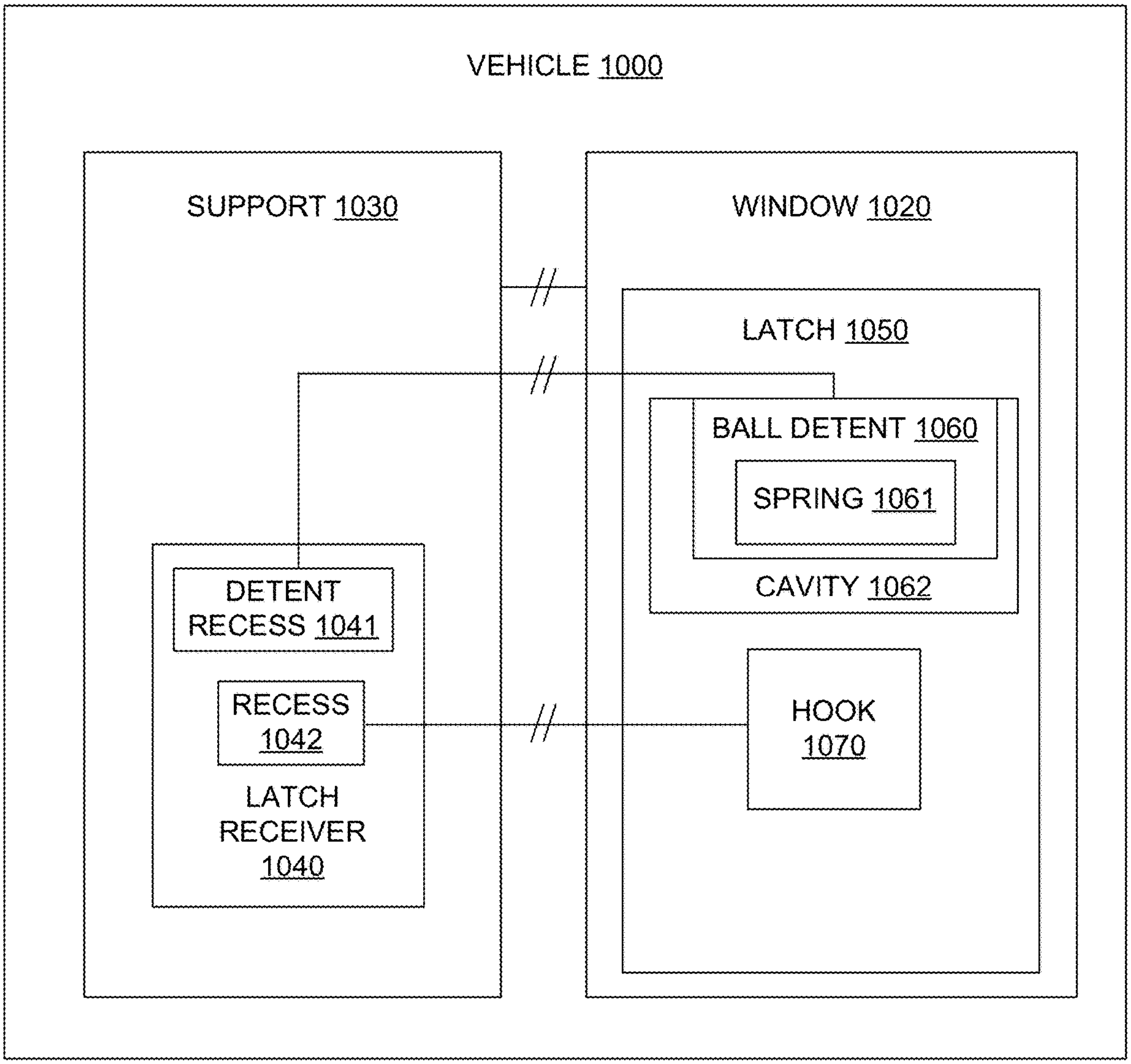
FIG. 10 is an illustrative block diagram of a vehicle including a window support, a window, and a latch apparatus that is configured to implement multiple states of the window, in accordance with some embodiments of the present disclosure.

FIG. 10 is an illustrative block diagram of vehicle 1000 including window support 1030 (support 1030 hereinafter), window 1020, and latch apparatus (e.g., latch 1050 and latch receiver 1040) that is configured to implement multiple states of window 1020, in accordance with some embodiments of the present disclosure. For example, vehicle 1000 may be the same as or similar to vehicle 100 of FIG. 1. Vehicle 1000 includes at least a window (e.g., window 1020) and support 1030, which are configured to be coupled to (e.g., as indicated by the connecting line) or decoupled from (e.g., as indicated by the diagonal hashmarks) each other. In other words, a connecting line with diagonal hashmarks as used herein indicates components that may be coupled or decoupled based on at least an action from a user (e.g., where the action may be to trigger one or more ranges of motion of a linear actuator).

In some embodiments, support 1030 of FIG. 10 includes latch receiver 1040 (e.g., as also illustrated in [[FIGS. 2-4]] FIGS. 2A-2F, 3A-3D, and 4A-4D), latch receiver 1040 including recess 1042 (e.g., for receiving latch hook 1070) and at least one detent recess (e.g., detent recess 1041 configured to receive at least one spring-loaded ball detent such as ball detent 1060). As illustrated, detent recess 1041 may couple to or decouple with ball detent 1060, and recess 1042 may couple to or decouple with hook 1070. In some embodiments, not shown, latch receiver 1040 also includes a protrusion configured to couple to a recess of a latch. Hook 1070 may include a loop or portion of a loop (e.g., closed or open loop) that may be engaged by recess 1042 (e.g., using any suitable mechanism).

In some embodiments, window 1020 includes latch 1050 (e.g., as also illustrated in [[FIGS. 2-4]] FIGS. 2A-2F, 3A-3D, and 4A-4D), latch 1050 including hook 1070 (e.g., for engaging with recess 1042 of latch receiver 1040) and at least one cavity (e.g., cavity 1062) including ball detent 1060 (e.g., for engaging with detent recess 1041 of latch receiver 1040), ball detent 1060 including spring 1061 configured to engage or disengage ball detent 1060 with detent recess 1041 of latch receiver 1040. As illustrated, ball detent 1060 may couple to or decouple from detent recess 1041, and hook 1070 may couple to or decouple from recess 1042. In some embodiments, latch 1050 also or alternatively includes a recess, configured to receive the protrusion of latch receiver 1040.

In some embodiments, the coupling and decoupling between window 1020 and support 1030, between ball detent 1060 and detent recess 1041, or between hook 1070 and recess 1042, or a combination thereof is configurable based on a position of latch 1050. The position of latch 1050 may be configurable based on a translation, range of motion, force, or other input from an actuator. In some embodiments, the translation or force from the actuator is configurable based on an input from a user.

Figure 11:
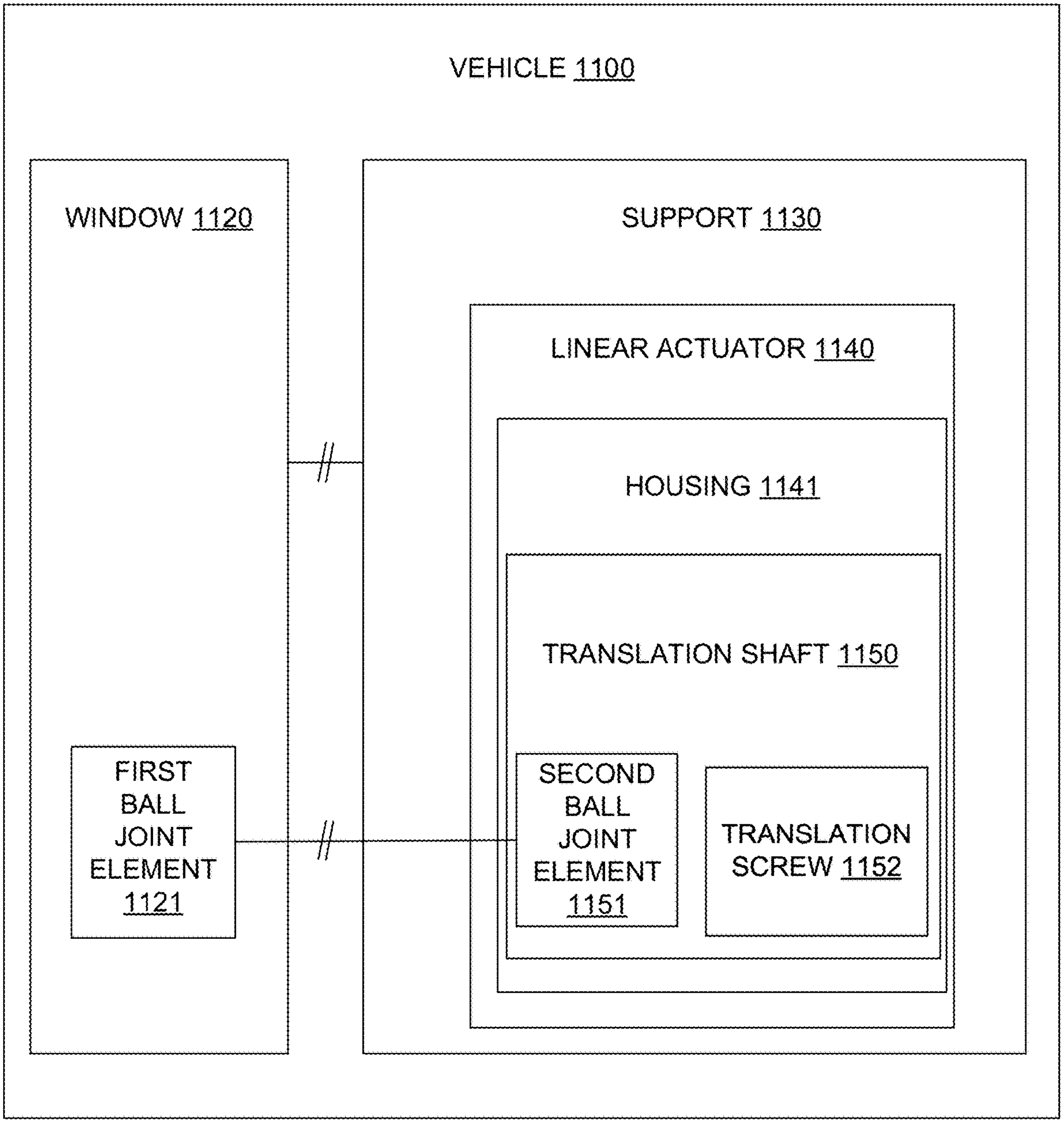
FIG. 11 is an illustrative block diagram of a vehicle including a window support, a window, and a linear actuator that is configured to implement multiple states of the window, in accordance with some embodiments of the present disclosure.

FIG. 11 is an illustrative block diagram of vehicle 1100 including window support 1130 (hereinafter support 1130), window 1120, and linear actuator 1140 that is configured to implement multiple states of window 1120, in accordance with some embodiments of the present disclosure. For example, vehicle 1100 may be the same as or similar to vehicle 100 of FIG. 1. Vehicle 1100 includes at least a window and a window support (e.g., window 1120 and support 1130), which are configured to be coupled to (e.g., as indicated by the connecting line) or decoupled from (e.g., as indicated by the diagonal hashmarks) each other.

In some embodiments, window 1120 includes first ball joint element 1121 (e.g., similar to those illustrated in [[FIGS. 6, 8-9]] FIGS. 6, 8A-8D, and 9A-9C), first ball joint element 1121 including a base (e.g., for mounting to the window) and a keyed ball (e.g., for coupling to a keyed socket). In some embodiments, the keyed ball includes a ball having flats on opposite sides. In some embodiments, first ball joint element 1121 also includes brackets surrounding the base and the keyed ball (e.g., to receive a housing of linear actuator 1140). As illustrated, first ball joint element 1121 may couple to or decouple with second ball joint element 1151. For example, second ball joint element 1151 may include a keyed socket (e.g., within a rotatable element), such that first and second ball joint elements 1121 and 1151 are coupled when the keyed ball is locked in the keyed socket (e.g., in response to a first rotational orientation of the rotatable element) and first and second ball joint elements 1121 and 1151 may be decoupled when the keyed ball is not locked in the keyed socket (e.g., in response to a second rotational orientation of the rotatable element).

In some embodiments, support 1130 includes linear actuator 1140 (e.g., which may be similar to those shown in FIGS. 6-9), linear actuator 1140 including translation screw 1152 (e.g., for driving a translation of elements coupled to translation screw 1152), translation shaft 1150 (e.g., which is coupled to translation screw 1152 via a corresponding female threading on the interior of translation shaft 1150) with a groove along a side (e.g., where the groove has a straight portion and a curved portion, the curved portion curving at least 80 degrees about the center axis), second ball joint element 1151 (e.g., a keyed socket within translation shaft 1150), and housing 1141 with a boss (e.g., where the boss traverses the groove of translation shaft 1150 and causes translation shaft 1150 to rotate when the boss traverses a curved region of the groove). As illustrated by the nested blocks of FIG. 11, in some embodiments, translation screw 1152 resides within translation shaft 1150 and translation shaft 1150 resides within housing 1141 (e.g., within concentric arrangements). As illustrated, second ball joint element 1151 resides inside translation shaft 1150, particularly at the side of translation shaft 1150 that mates with first ball joint element 1121 (e.g., have reciprocal shapes that fit together); translation screw 1152 resides behind (e.g., looking from first ball joint element 1121) second ball joint element 1151, toward the interior of linear actuator 1140 (e.g., the actuator motor), and within translation shaft 1150.

In some embodiments, the coupling and decoupling between window 1120 and support 1130, between first and second ball joint elements 1121 and 1151, or a combination thereof, is configurable based on an actuation of linear actuator 1140 (e.g., which correspondingly positions translation screw 1152 and translation shaft 1150). As mentioned, the actuation (e.g., an applied translation, range of motion, force, or other action) from linear actuator 1140 may occur in response to an input from a user. In some embodiments, linear actuator 1140 may include multiple ranges of motion, in which a first range of motion opens window 1120 to a vented position (e.g., without making window 1120 readily separable from support 1130) and a second range of motion opens window 1120 to a removable position (e.g., in which window 1120 is readily separable from support 1130).

FIG. 12 is an illustrative block diagram of vehicle 1200 including linear actuator 1240 and corresponding control circuitry 1210, memory 1220, and processing circuitry 1230, in accordance with some embodiments of the present disclosure. In some embodiments, one or more of control circuitry 1210, memory 1220, and processing circuitry 1230 may reside within an apparatus coupled to linear actuator 1240 (e.g., to a translation screw within the motor and gear box container and/or within the circuitry container, as illustrated in FIG. 6). Vehicle 1200 includes user input device 1250, control circuitry 1210 configured to deliver actuator commands 1211 (e.g., corresponding to first and second ranges of motion of the actuator), linear actuator 1240 (e.g., configured to drive a translation shaft through at least first and second ranges of motion 1241 and 1242), memory 1220, and processing circuitry 1230 (e.g., to relate window positions, including the closed, vented, and removable positions, to corresponding actuator commands 1211).

In some embodiments, user input device 1250 may include any one or more of a button, slider, joystick, touch screen, any other user-responsive display of the vehicle, or any combination thereof. In some embodiments, user input device 1250 may include any suitable hardware configured to operate a corresponding software application (e.g., a smart phone, smart watch, or other device configured for internet connectivity and/or telecommunication capabilities), where the software application is configured to operate control circuitry 1210, memory 1220, processing circuitry 1230, or a combination thereof. In some embodiments, user input device 1250 may include a key, key fob, or any other suitable mechanical or electromechanical apparatus coupled to the vehicle (e.g., as is needed to turn on vehicle 1200). In some embodiments, for example, actuator commands 1211 may be generated automatically by control circuitry 1210 based on at least one other signal such as a temperature (e.g., of an occupant compartment or a zone thereof, or an ambient temperature), a speed of the vehicle, a locked/unlocked state of the vehicle, a climate control signal (e.g., based on a user setting), any other suitable signal, any other suitable criteria, or any combination thereof. For example, control circuitry 1210 may receive information from sensors or other vehicle controllers or systems and may generate actuator commands 1211 based on that information.

As shown in FIG. 12, in some embodiments, user input device 1250 is coupled to control circuitry 1210. In some embodiments, memory 1220 and processing circuitry 1230 are also coupled to control circuitry 1210, and control circuitry 1210 is coupled to linear actuator 1240. In an illustrative embodiment, a user may select a desired window removal position from various options presented or otherwise made accessible by user input device 1250. In response, control circuitry 1210 may retrieve, from memory 1220, processing circuitry 1230, or both, instructions for how to translate the window removal position into an actuator command (e.g., window position instructions 1221). In response to retrieving an actuator command, control circuitry 1210 may provide one or more actuator commands 1211 to linear actuator 1240 (e.g., to provide a certain voltage, current, or power, or schedule thereof to linear actuator 1240). In response to receiving one or more actuator command (e.g., of actuator commands 1211), linear actuator 1240 may move through first range of motion 1241 (e.g., if the window is transitioning from the closed position to the vented position), linear actuator may move through second range of motion 1242 (e.g., if the window is transitioning from the vented position to the removable position), or linear actuator 1240 may move through both first and second ranges of motion 1241 and 1242 (e.g., if the window is transitioning from the closed position, through the vented position, to the removable position). Therefore, the configurable window positions may be responsive to an input provided by a user of vehicle 1200 via user input device 1250.

Figure 13C:
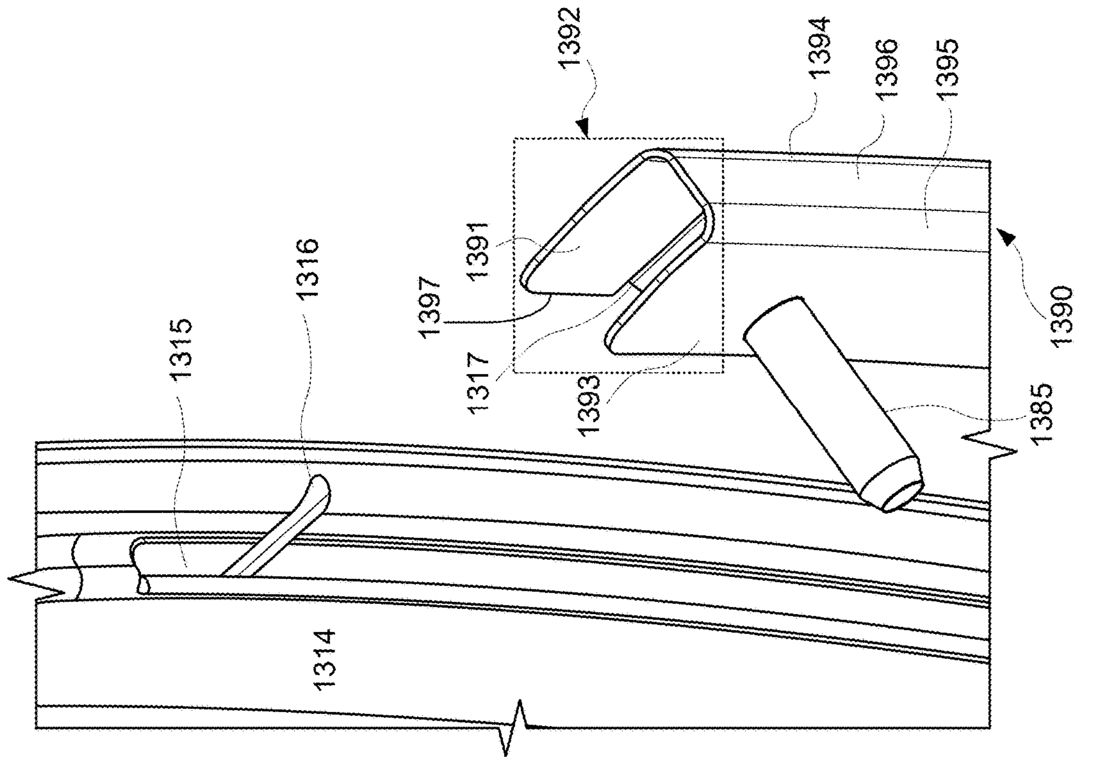
FIGS. 13A-13C show an illustrative window and living hinge in closed and moved positions, in accordance with some embodiments of the present disclosure.
Figure 13A:
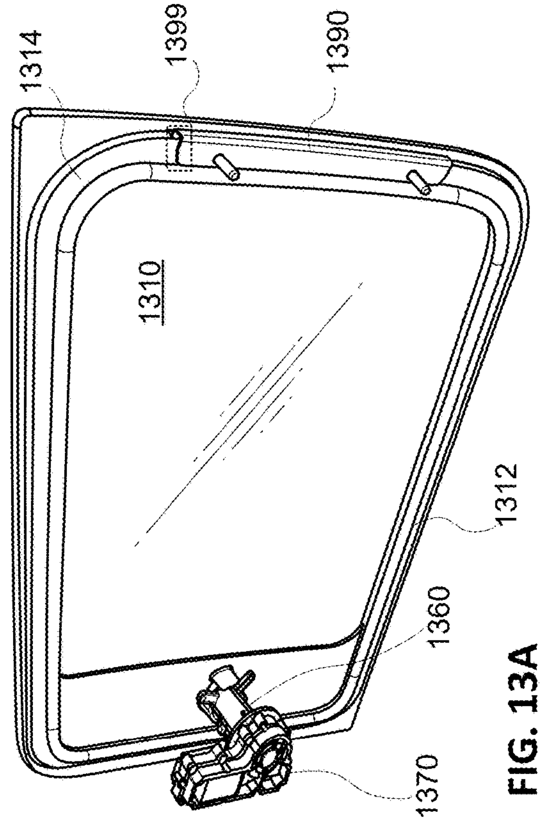
Figure 13B:
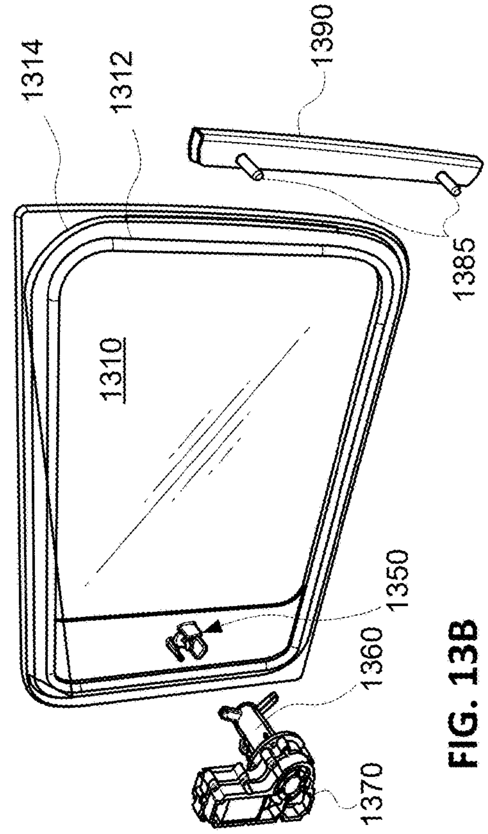

FIGS. 13A-13C show illustrative window 1310 and living hinge 1390 in closed and moved positions, in accordance with some embodiments of the present disclosure. As illustrated in FIG. 13A, in the closed position (also referred herein as a closed configuration), living hinge 1390 is mated to encapsulation frame 1314 based on flange 1391 of living hinge 1390. In particular, the partially obscured end of u-shape section 1392 (e.g., end 1397 of flange 1391) is mated with recess 1315 of encapsulation frame 1314. As illustrated in FIG. 13B, in an “after removal” configuration, window 1310 and encapsulation frame 1314 can release from living hinge 1390 and “pop out” of a support (not shown) to which living hinge 1390 may remain affixed (e.g., under normal operation is not separable). Comparing the illustrations of FIGS. 13A and 13B, living hinge 1390, linear actuator 1370, and housing 1360 may remain in substantially fixed positions (e.g., with small possible adjustments that are made to release window 1310). As illustrated in FIG. 13B, in a removed configuration, window 1310 may be “popped out” (e.g., pushed back through an axis oriented into the surface of the page). Because window 1310 is further back in FIG. 13B (e.g., after removal), it is illustrated as smaller as it would be at the same depth as compared to living hinge 1390, linear actuator 1370, and housing 1360. Linear actuator 1370 and housing 1360 may be similar to those described in FIGS. 6, 7A-7D, 8A-8D, and 9A-9C. Housing 1360 (e.g., which may be similar to housing 660 of FIG. 6) is configured to engage and disengage from element 1350 (e.g., which may be similar to ball joint element 650 of FIG. 6).

FIG. 13C illustrates an enlargement of living hinge 1390 and the recess in encapsulation frame 1314. As shown, the living hinge includes flange 1391 with a flange end surface (e.g., end 1397), base section 1393, first curved section 1394 and second curved section 1395, and planar section 1396 between the first and second curved sections 1394 and 1395. Flange 1391, curved sections 1394 and 1395, planar section 1396, and base section 1393 of living hinge 1390 form a u-shape indicated by u-shape section 1392. In some embodiments, flange 1391 mates with recess 1315 of encapsulation frame 1314. As illustrated, recess 1315 of encapsulation frame 1314 includes locating feature 1316 (e.g., a recess such as a hole or slot configured to receive locating feature 1317 of living hinge 1390) that may be used for aligning encapsulation frame 1314 to a particular position of living hinge 1390 when coupling encapsulation frame 1314 to a support (e.g., a pillar) of a vehicle. For example, locating features 1316 and 1317 may include any suitable interfacing features such as male-female features (e.g., a boss and a recess such as ribs and slots, or pins and holes), interlocking features that may slide in one dimension (e.g., a key and slot), or any other suitable interface to constrain a relative position of living hinge 1390 and window 1310. As illustrated, living hinge 1390 includes one or more mounting features 1385. One or more mounting features 1385 may include one or more pins (e.g., as illustrated), one or more holes (e.g., for fasteners), detent features, locking features, keyed interfaces, snap-fit interfaces, press-fit interfaces, latched interfaces, any other suitable feature for mounting base section 1393 to a vehicle (e.g., a support thereof), or any combination thereof.

Figure 14A:
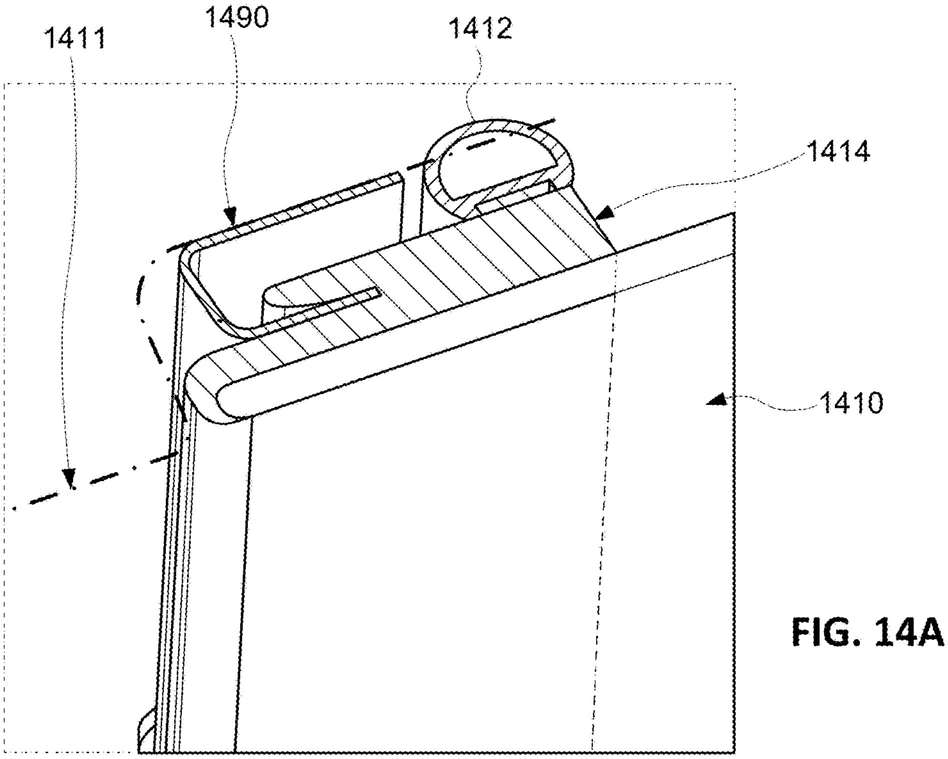
FIGS. 14A-14B show illustrative depictions of a living hinge releasably interfacing with a recess of a window, in accordance with some embodiments of the present disclosure.
Figure 14B:
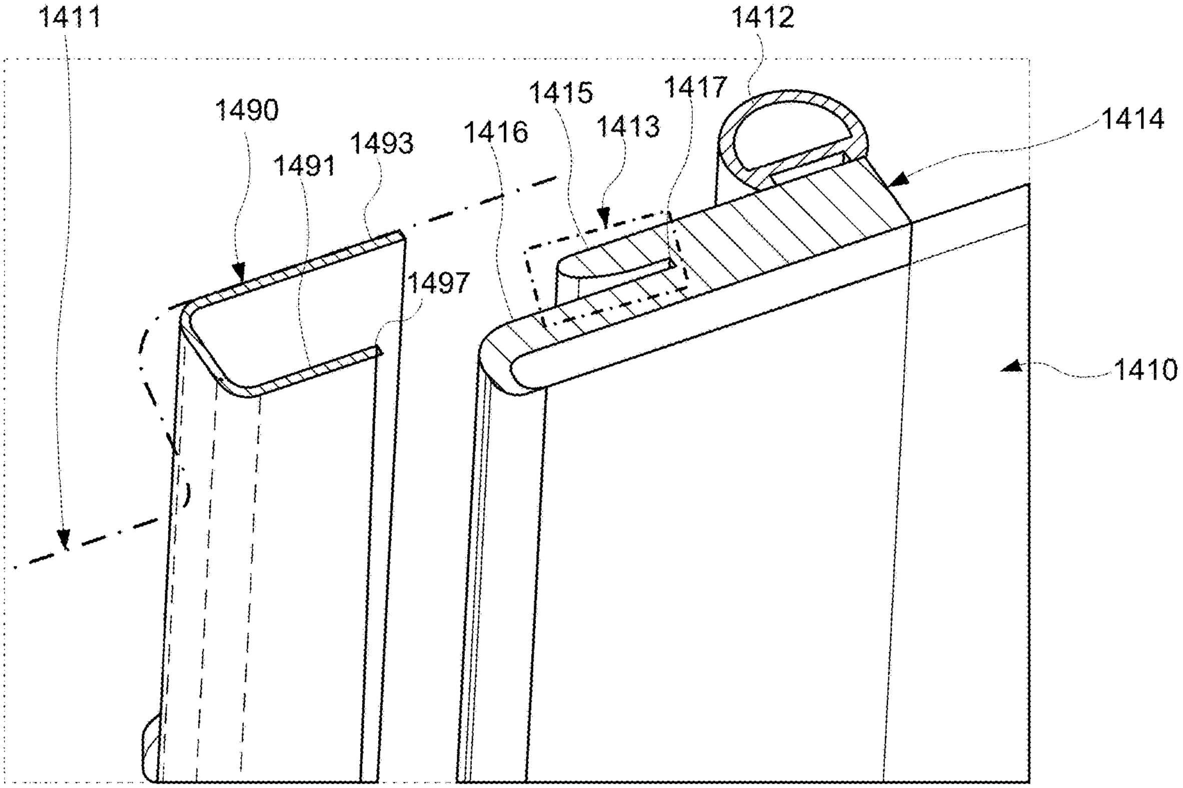

FIGS. 14A-14B show an illustrative interface between living hinge 1490 and recess 1413 of window 1410. In some embodiments, recess 1413 is in encapsulation frame 1414 of window 1410, as illustrated. In some embodiments, the recess of the window may be arranged in another support of the window. As illustrated, recess 1413 is located at an edge of window 1410. As illustrated in FIG. 14A, in the closed or venting positions, flange 1491 of living hinge 1490 is configured to interface with recess 1413 of window 1410 such that end surface 1497 of flange 1491 interfaces with bottom 1417 of recess 1413 and opposite sides of the flange interface with the first and second walls of recess 1413 (e.g., walls 1415 and 1416 that define recess 1413. Base 1493 is affixed to support 1411 (e.g., only a boundary of which is illustrated), such that window 1410 is thereby affixed to support 1411. Bulb seal 1412 may form a substantially airtight seal between window 1410 and the interior of a vehicle (e.g., support 1411) to which window 1410 is affixed.

As shown in FIG. 14B, in the removal position, window 1410 slides or pops out of living hinge 1490. In particular, window 1410 may be removed by applying a force that is oriented normal to end surface 1497 of flange 1491. When window 1410 is removed, living hinge 1490 remains in a substantially fixed position due to being affixed (e.g., fastened using one or more fasteners) to support 1411, and bulb seal 1412 is also removed due to being affixed (e.g., glued) to window 1410.

Figure 15:
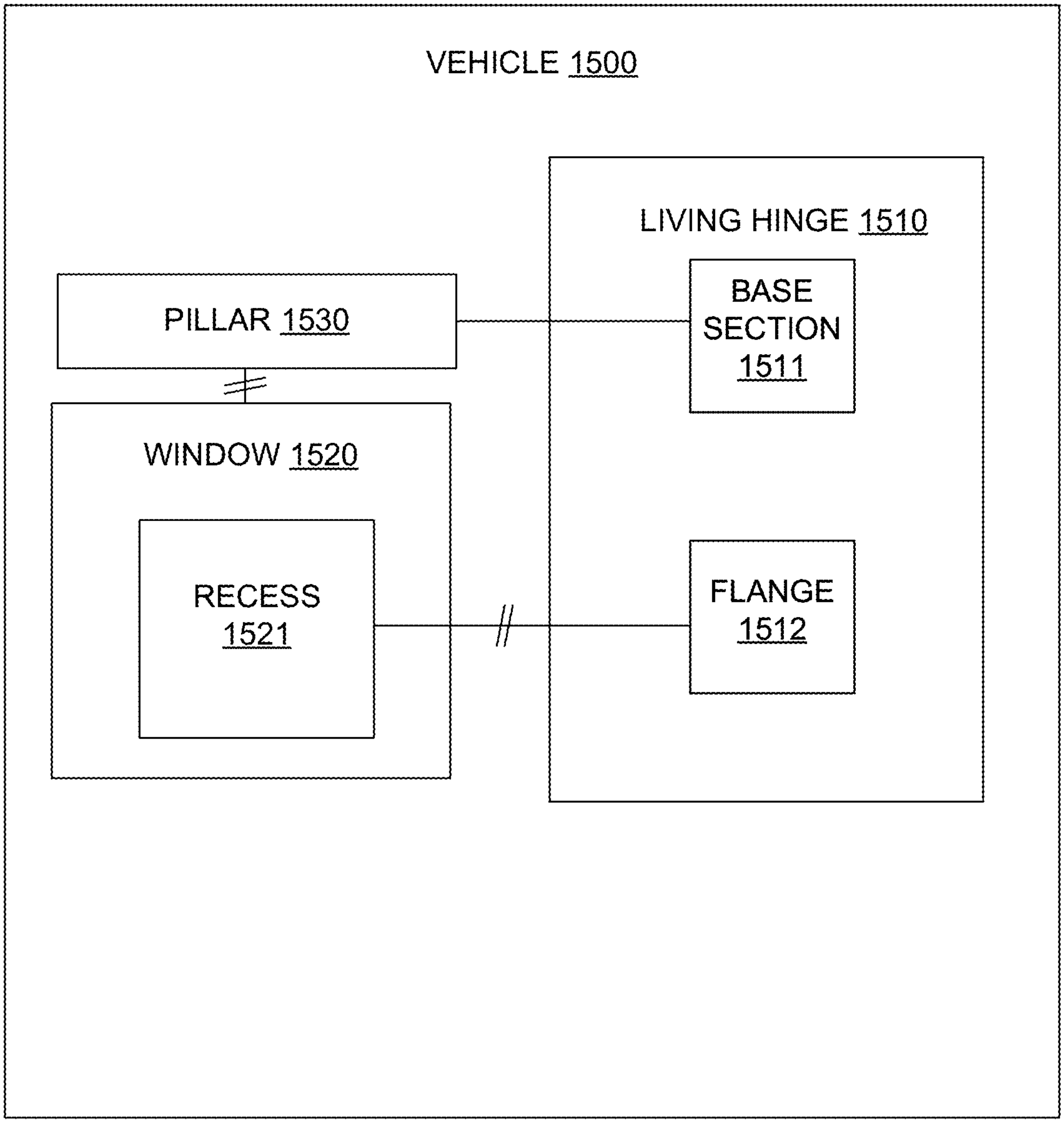
FIG. 15 is an illustrative block diagram of a vehicle including a pillar, a window, and a living hinge, in accordance with some embodiments of the present disclosure.

FIG. 15 shows an illustrative block diagram of vehicle 1500 that includes living hinge 1510, window 1520, and pillar 1530, in accordance with some embodiments of the present disclosure. As illustrated, living hinge 1510 includes at least one base section (e.g., base section 1511) and flange 1512, and window 1520 includes at least one recess (e.g., recess 1521). In some embodiments, window 1520 also includes an encapsulation frame and the recess is in an encapsulation frame of the window. In some embodiments, window 1520 or an encapsulation frame thereof and living hinge 1510 also include corresponding locating features that are used to properly align living hinge 1510 in recess 1521 of window 1520. Base section 1511 of living hinge 1510 couples to pillar 1530 (e.g., it is fastened or otherwise affixed to the pillar) and cannot be disconnected without a relatively large force (e.g., such that it does not become inadvertently dislodged). Flange 1512 of living hinge 1510 releasably mates with recess 1521, causing window 1520 to releasably mate with pillar 1530. As described above, the connecting lines with two diagonal hash marks indicate releasable couplings between the elements of FIG. 15 and other block diagrams.

Figure 16:
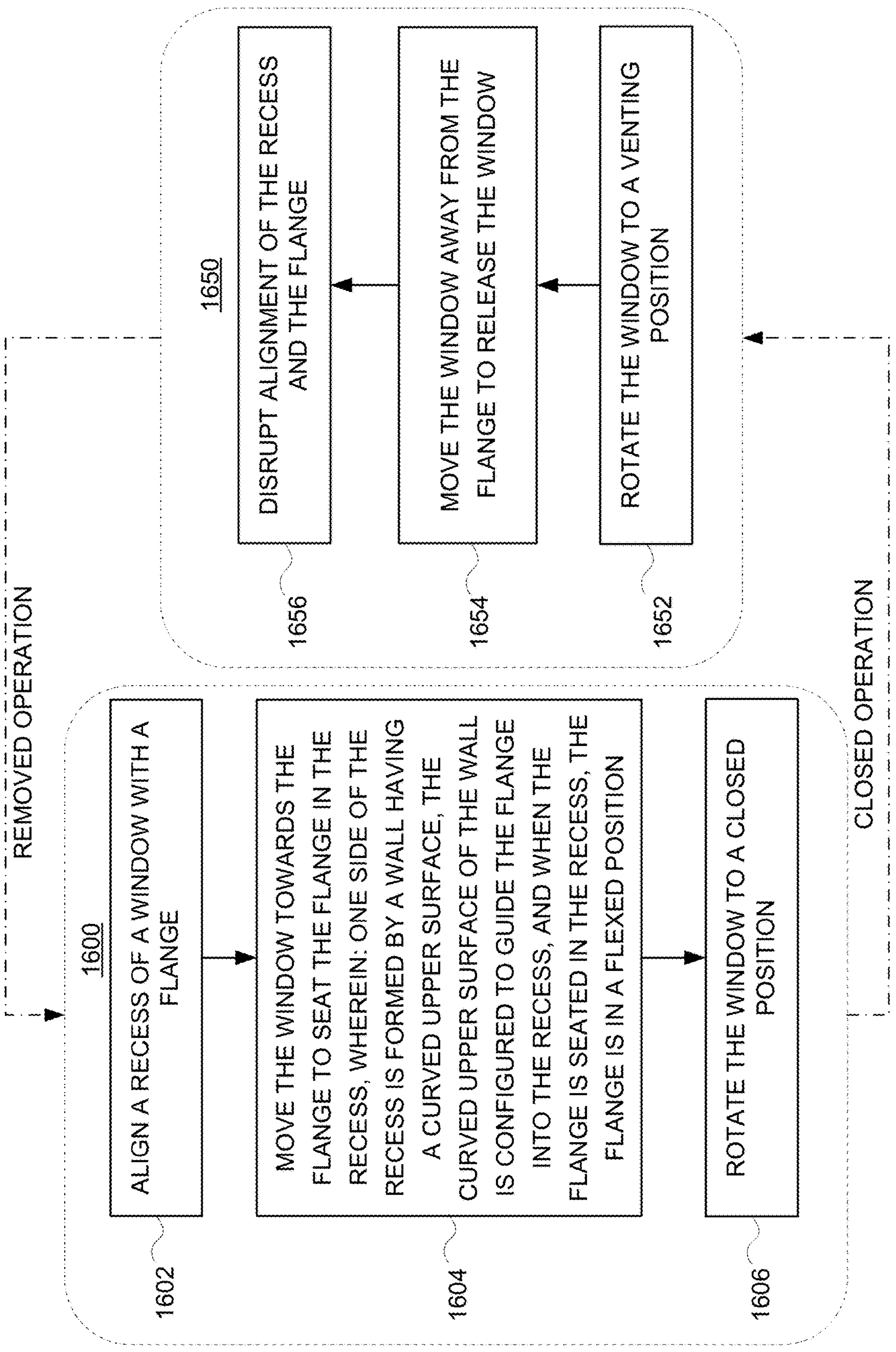
FIG. 16 is a flowchart of an illustrative process for installing a window, in accordance with some embodiments of the present disclosure.

FIG. 16 is a flowchart of illustrative process 1600 for installing a window, in accordance with some embodiments of the present disclosure. In some embodiments, process 1600 may be used to assemble (or may be similarly used to disassemble) a living hinge and a window/encapsulation frame, such as those shown in FIGS. 13A-13C, FIGS. 14A-14B, FIG. 15, FIG. 16, and FIGS. 17A-17B. Step 1602 includes aligning a recess of a window with a flange. In some embodiments, a locating feature on the window, the flange, or both is used to align the recess of the window with the flange. Step 1604 includes moving the window towards the flange to seat the flange in the recess. For example, in some embodiments, one side of the recess is formed by a wall having a curved upper surface, the curved upper surface of the wall is configured to guide the flange into the recess, and when the flange is seated in the recess, the flange is in a flexed position. Step 1606 includes rotating the window to a closed position (e.g., about a pivot or hinge joint).

In some embodiments, removing the window is substantially similar to process 1600 but performed in reverse, or otherwise modified, order. For example, step 1652 includes rotating the window, e.g., rotated into a venting position, and step 1654 includes moving the window away from the flange (e.g., with the flange in a flexed position) to release the window. In some embodiments, the removal method does not require any operation corresponding to step 1602. In some embodiments, step 1656 includes disrupting an alignment between the recess of the window and the flange (e.g., disengaging one or more locating feature) to fully remove the window from a support to which the flange is coupled.

Figure 17A:
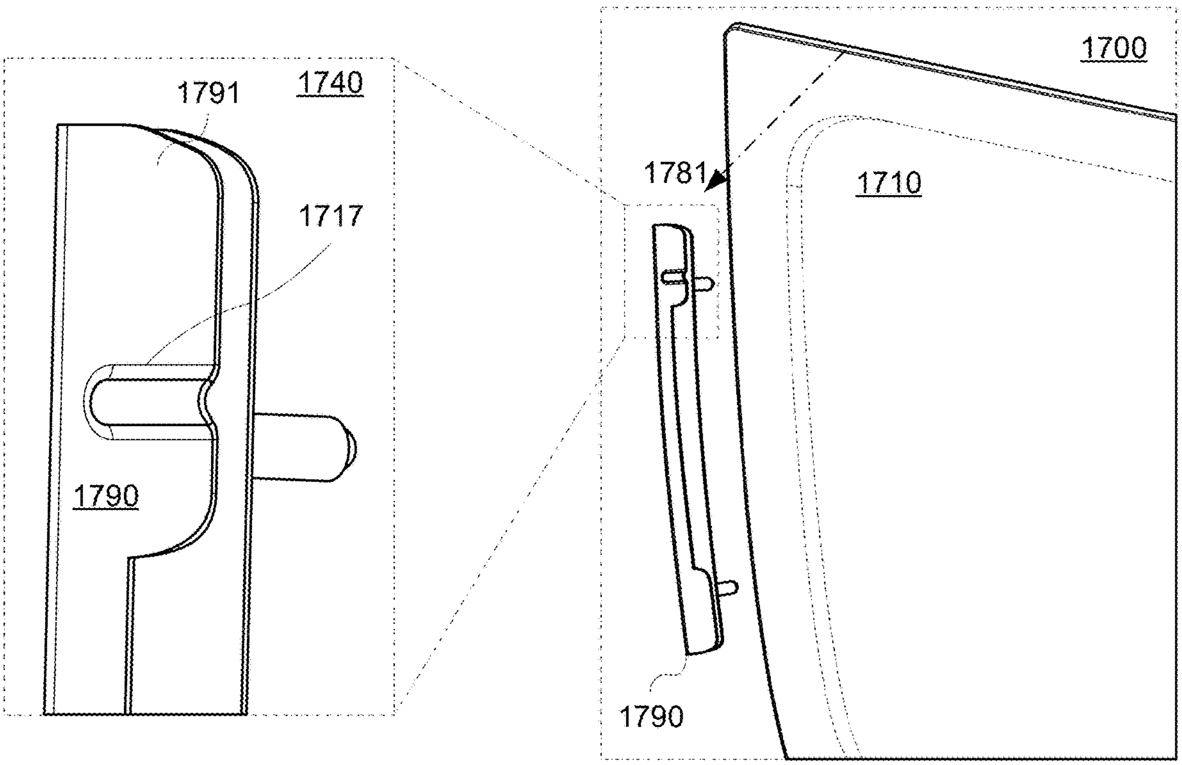
FIGS. 17A-17B show illustrative depictions of aspects of a living hinge for releasable mating with a corresponding support, in accordance with some embodiments of the present disclosure.
Figure 17B:
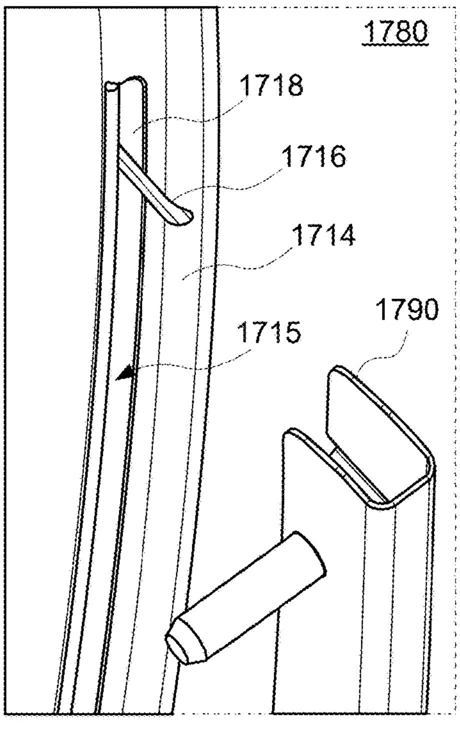

FIGS. 17A-17B show illustrative details of living hinge 1790 and window that are configured for disassembly and reassembly. As illustrated in FIG. 17A, in an "After Removal" configuration, living hinge 1790 is separated from window 1710. Although not shown in FIGS. 17A-17B, in some embodiments, living hinge 1790 remains coupled to a support (e.g., a pillar of a vehicle) after window 1710 is disconnected (e.g., living hinge 1790 may be attached more permanently to the support). As illustrated in the enlargement 1740 in FIG. 17A, which shows a portion of living hinge 1790, ridge 1717 of flange 1791 (e.g., which may be similar to locating feature 1317 of flange 1391 of FIGS. 13A-13C) may be aligned with a slot (e.g., locating feature 1716, which may be similar to locating feature 1316 of FIG. 13 FIGS. 13A-13C) in sidewall 1718 of recess 1715 in window 1710 (e.g., recess 1715 being in encapsulation frame 1714 or other support structure of window 1710). The view of FIG. 17B, taken from approximately the perspective of direction 1781 FIG. 17A, shows additional aspects of the interface (although ridge 1717 is substantially hidden due to observing the other side of living hinge 1390). Based on the interface between locating feature 1716 and ridge 1717, window 1710 may be readily reassembled with living hinge 1790 and be readily reconnected to a vehicle or other support to which living hinge 1490 is affixed or otherwise configured to be affixed.

Figure 18:
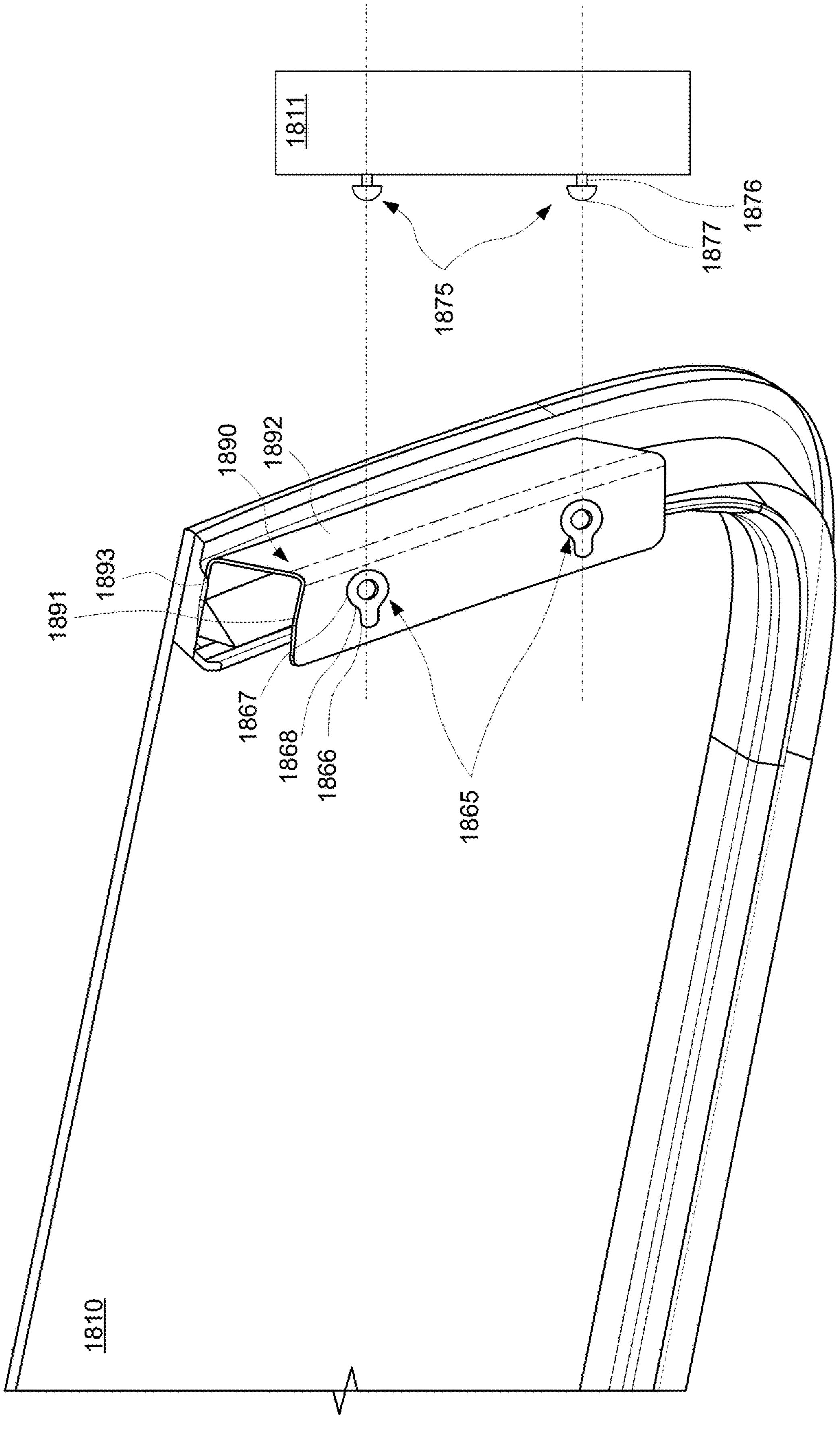
FIG. 18 is an illustrative depiction of another window and living hinge having fastening elements and a corresponding support, in accordance with some embodiments of the present disclosure.

FIG. 18 is an illustrative depiction of another window and living hinge having fastening elements and a corresponding support, in accordance with some embodiments of the present disclosure. Living hinge 1890 differs in some respects from living hinge 1790 of FIGS. 17A-17B. Living hinge 1890 includes base section 1893 that is affixed to window 1810 (e.g., using fasteners, adhesives, or any other suitable affixation mechanism the prevents separation). For example, when removing window 1810 from a support structure (e.g., support 1811), living hinge 1890 detaches from the support structure (and remains affixed to window 1810) such that window 1810 may be detached from the support structure. Living hinge 1890 also includes flange 1891 and curved hinge section 1892 that connects to base section 1893 and to flange 1891 (e.g., is part of the same continuous component, or otherwise in contact with) thus coupling base section 1893 to flange 1891.

As shown in FIG. 18, living hinge 1890 includes flange 1891 with one or more fastening elements 1865 (also referred to as first fastening elements 1865) that are configured to releasably couple to respective one or more fastening elements 1875 (also referred to as second fastening elements 1875) of support 1811 (e.g., window 1810 may also interface to a plurality of supports or otherwise be interchangeable among vehicles). For example, fastening elements 1865 may be openings in flange 1891, where each opening includes a respective small opening 1866, large opening 1867, and choke point 1868. Support 1811 to which living hinge 1890 releasably couples includes second fastening elements 1875, each of which may correspond to a respective first fastening element of first fastening elements 1865. For example, one or more fastening elements 1875 (e.g., second fastening elements) may be mushroom-head protrusions including mushroom head 1877 (e.g., or any other suitable cap of a sphere or ellipsoid) and neck 1876 (e.g., or any other suitable extended component with a smaller width than the head). As shown, a size of mushroom head 1877 may correspond to large openings 1867 and size of neck 1876 may correspond to small opening 1866.

In an illustrative assembly process consistent with the apparatus shown in FIG. 18, window 1810 may be aligned with and coupled to support 1811 such that mushroom heads of second fastening elements 1875 penetrate the large openings of first fastening elements 1865. Then, window 1810 may be maneuvered such that the necks (e.g., neck 1876) of second fastening elements 1875 pass through the choke points of the first fastening elements (e.g., choke points 1868) until these necks reside in the small openings of the first fastening elements (e.g., small opening 1866). Therein, the mushroom heads of the second fastening elements (e.g., mushroom head 1877) will not be able to release from the small openings (e.g., small opening 1866) unless a corresponding lateral force is applied (e.g., as occurs during disassembly) to push these necks back into the large openings of the first fastening elements (e.g., large opening 1867). For example, as illustrated, each of first fastening elements 1865 include a respective choke point 1868 between the respective large opening and the small opening, and each choke point provides a snap-fit connection with the neck of a respective mushroom-head protrusion. To illustrate, the snap-fit connection between first fastening elements 1865 and second fastening elements 1875 is a contact interface where a force is applied to lock the components together past some resistance (i.e., choke point1868) to secure the interface.

Figure 19:
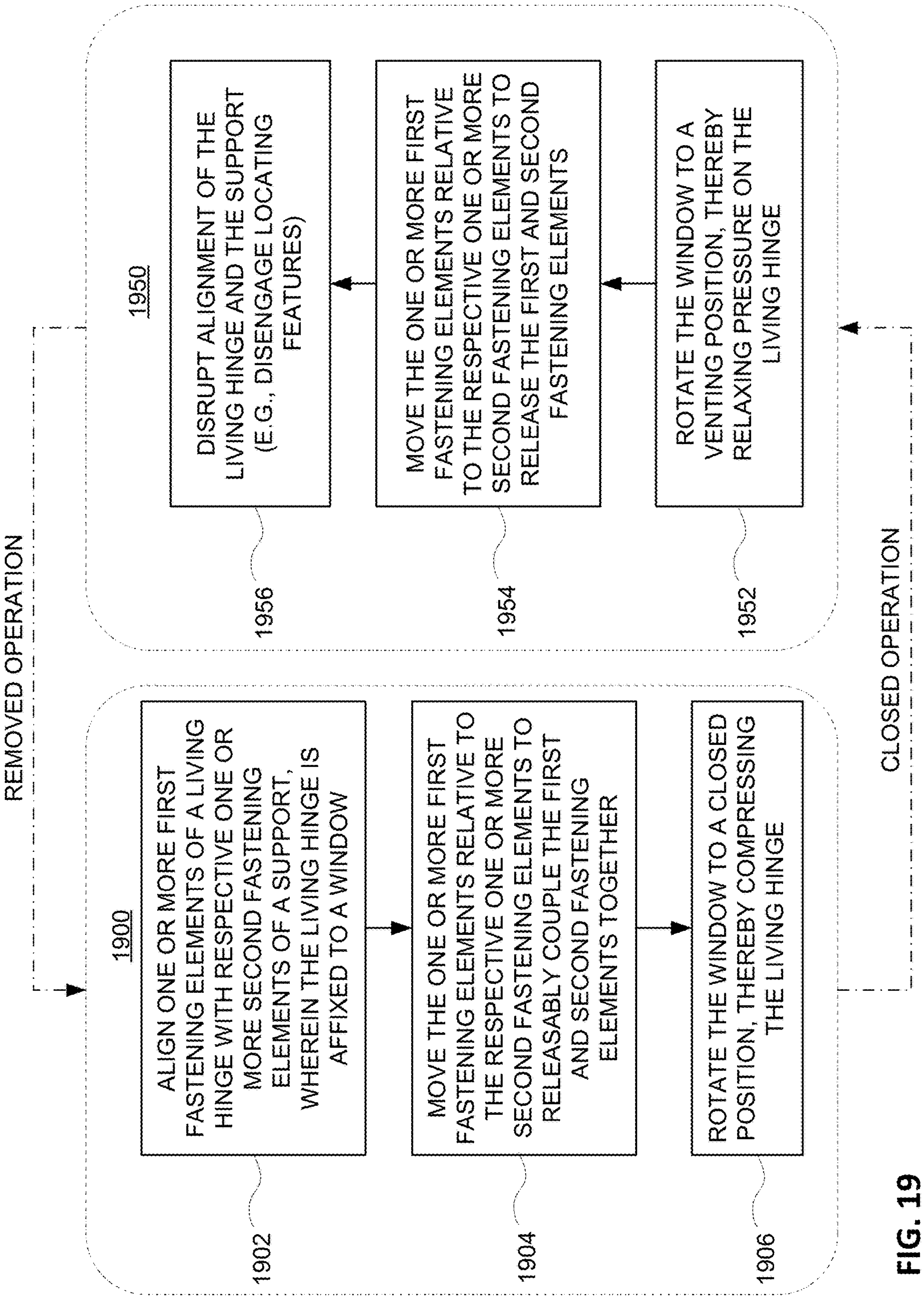
FIG. 19 is a flowchart of an illustrative process for installing a removable window, in accordance with some embodiments of the present disclosure.

FIG. 19 is a flowchart of illustrative process 1900 for installing a window, in accordance with some embodiments of the present disclosure. In some embodiments, process 1900 may be used to assemble (or may be similarly used to disassemble) the living hinge and the support/pillar as shown in FIG. 18. Step 1902 includes aligning one or more first fastening elements of a living hinge with respective one or more second fastening elements of a support, wherein the living hinge is affixed to a window (e.g., is not detachable from the window). In some embodiments, a locating feature on the window, the flange, or both is used to align the recess of the window with the flange. Step 1904 includes moving the one or more first fastening elements relative to the respective one or more second fastening elements to releasably couple the first and second fastening elements together. Step 1906 includes rotating the window to a closed position, thereby compressing the living hinge.

In some embodiments, corresponding process 1950 to remove the window is substantially similar to that of process 1900 but performed in reverse order, or an otherwise suitably modified order. For example, step 1952 includes rotating the window into a venting position, thereby releasing some pressure on the living hinge, and step 1954 may include moving one or more first fastening elements relative to the respective one or more second fastening elements to release the first fastening elements from the second fastening elements. In some embodiments, process 1900 need not include step 1956. In some embodiments, process 1900 includes disrupting an alignment between the living hinge and the support (e.g., disengaging one or more locating feature) to fully remove the window from a support to which the living hinge is coupled.

Figure 20A:
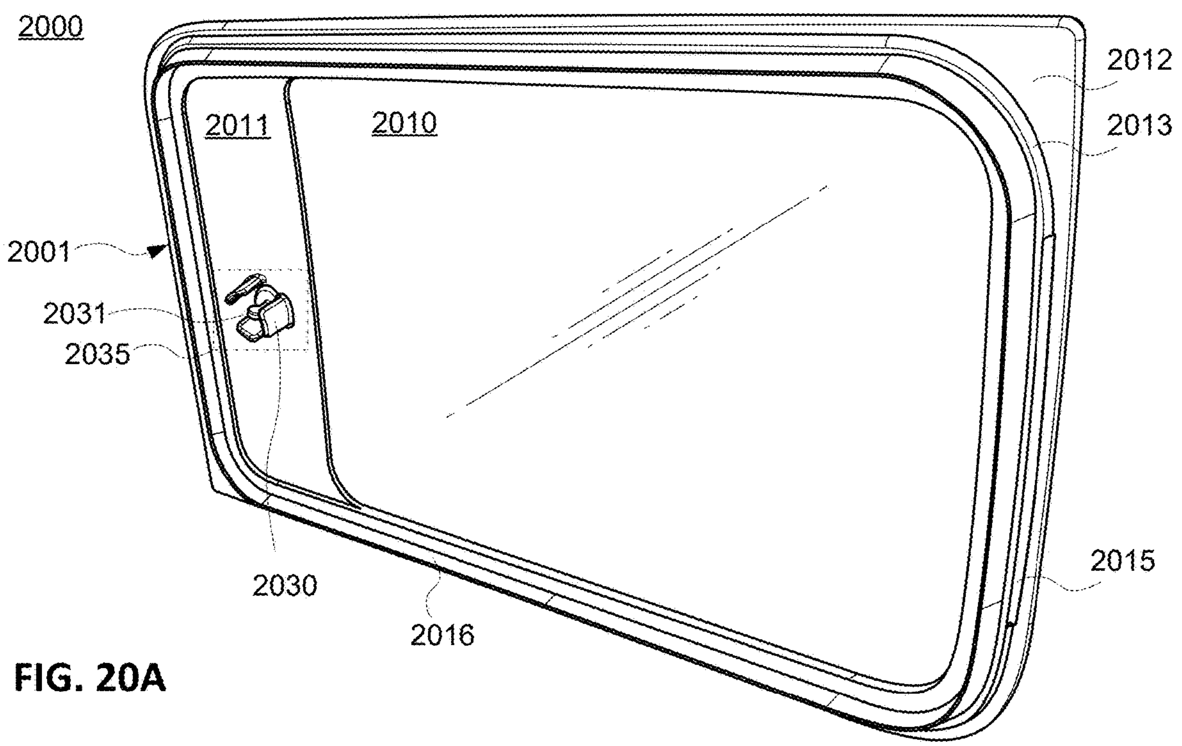
FIGS. 20A-20B show illustrative depictions of a modular window that is configurable for fixed, venting, or removable installations, in accordance with some embodiments of the present disclosure.
Figure 20B:
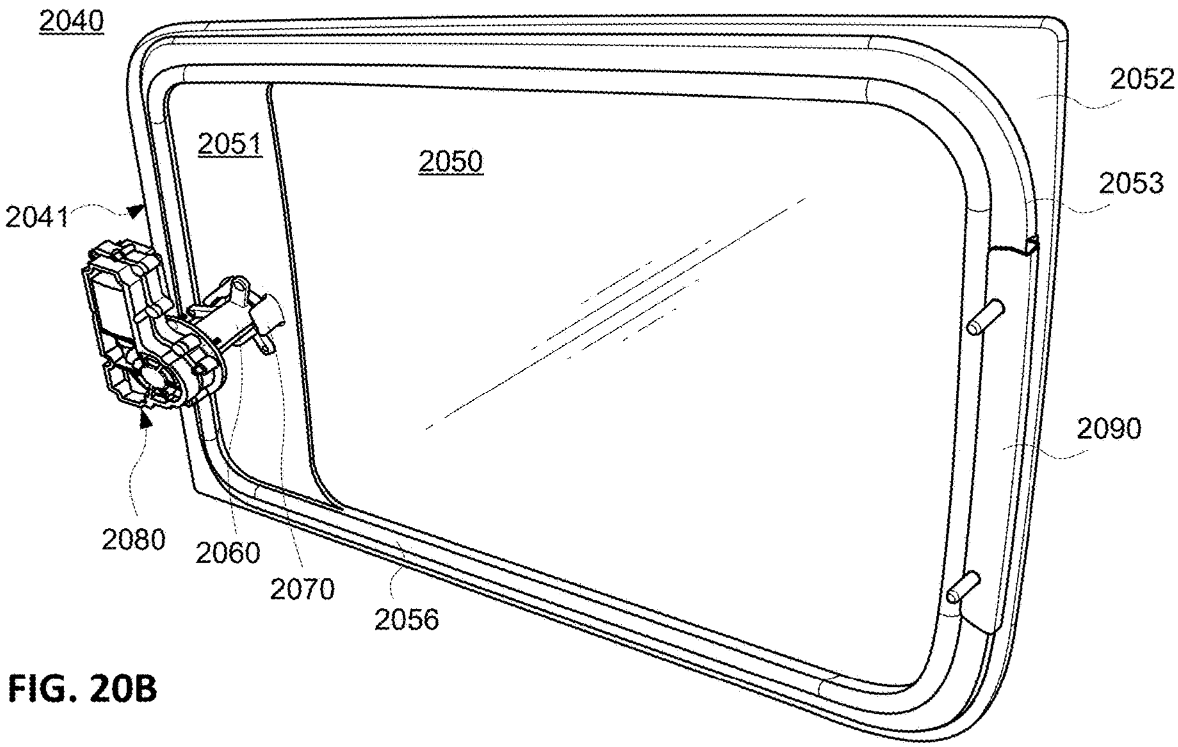

FIGS. 20A-20B show illustrative implementations of a modular window that is configurable for a fixed installation (as shown in FIG. 20A) or a venting/removable installation (as shown in FIG. 20B), in accordance with some embodiments of the present disclosure. In both possible installations, the modular window may include glass (e.g., a window pane), an encapsulation frame with first and second slides, a slot, and a mechanical interface including a plurality of protrusions and a ball of a ball joint. Modular window 2001 is configured for a fixed installation, and the modular window additionally includes glue bead 2016. In venting or removable installations, such as that illustrated in FIG. 20B, the modular window additionally includes bulb seal 2056 and a mating feature. In some embodiments, the venting or removable installations may also include linear actuator 2080 and housing 2060 that is coupled to mechanical interface 2035 of the modular window 2001. In some embodiments, modular window 2041 is the same (e.g., having equivalent components and manufacturing processes) when installed in either of the venting or removable positions, as illustrated in FIG. 20B. In some embodiments, a setting, software update, user input, any suitable local action, any suitable remote action, or any combination thereof may configure the installed modular window 2041 to be in either of the venting or the removable states.

As shown in FIGS. 20A-20B, first side 2011 of encapsulation frame 2012 includes mechanical interface 2035. In the fixed installation illustrated in FIG. 20A, mechanical interface 2035 (ball joint element 2031 and bracket 2030) need not be coupled to any other structures. In the venting or removable installations illustrated in FIG. 20B, this mechanical interface is coupled to linear actuator 2080 and housing 2060 (e.g., to drive modular window 2041 between closed, vented, and removable positions). Second side 2013 of encapsulation frame 2012 includes mating feature 2015 (e.g., a recess, slot, or other suitable feature for interfacing to a support), where mating feature 2015 includes a slot as illustrated. In the fixed installation illustrated in FIG. 20A, this mating feature need not be coupled to any other structures. In the venting or removable installations illustrated in FIG. 20B, this mating feature may be coupled to living hinge 2090, where living hinge 2090 releasably couples encapsulation frame 2052 to a vehicle or another support of modular window 2041. When modular window 2041 is in the venting or removable installation, bulb seal 2056 forms a substantially airtight seal when modular window 2041 is in a closed position, without preventing modular window 2041 from releasing into venting or removable positions (e.g., maintains the closed position and seal). When modular window 2001 is in a fixed installation, glue bead 2016 forms a more permanent and more substantially airtight seal.

In some embodiments, a modular window such as modular windows 2001 and 2041 illustrated in FIGS. 20A-20B may be desirable to reduce manufacturing complexity and degrees of freedom while offering multiple possible end-product configurations. For example, a single modular window design may be mass produced and integrated into at least two possible assembly options. In the first assembly option (e.g., fixed installation), a glue bead is applied and the encapsulation frame is affixed to a vehicle or other suitable window support such that it is not intended as removable. In the second assembly option (e.g., the venting or removable installation), a bulb seal, living hinge, housing, and linear actuator are applied and the encapsulation frame is installed to a vehicle or other suitable window support. In some embodiments, the living hinge, housing, and linear actuator may be applied after the window (with the bulb seal) is installed in the vehicle or other suitable window support.

Figure 21:
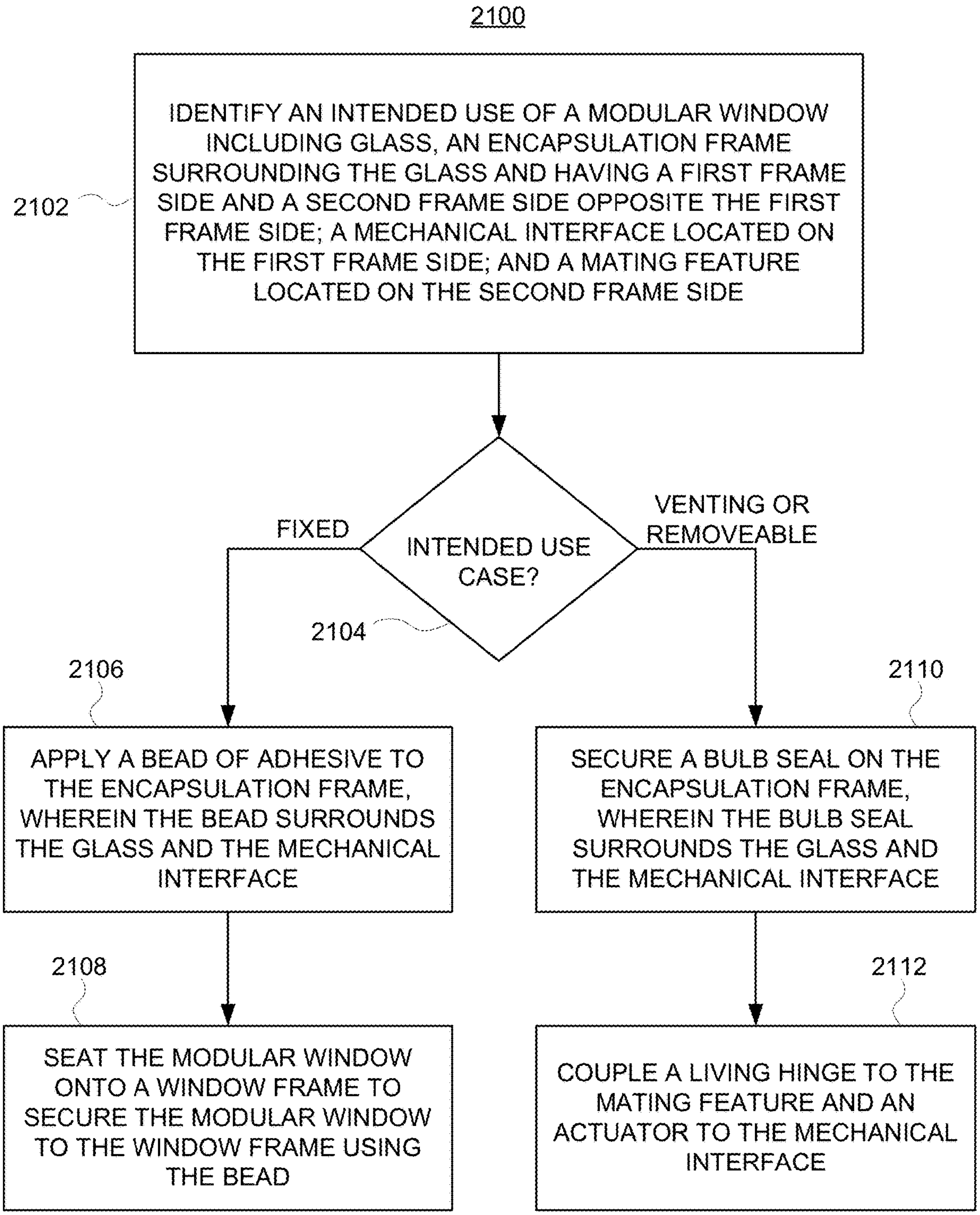
FIG. 21 is a flowchart of an illustrative process for installing a modular window, in accordance with some embodiments of the present disclosure.

FIG. 21 is a flowchart of illustrative process 2100 for installing a modular window, in accordance with some embodiments of the present disclosure. In some embodiments, process 2100 or portions thereof may be used to install the modular window as shown in FIGS. 20A-20B (e.g., with a living hinge, actuator and housing). Step 2102 may include identifying an intended use of a modular window. The intended use may be one of fixed, venting, or removable, for example, as illustrated in Step 2104. Steps 2102 and 2104 may be combined, for example, where use cases are identified at step 2102 and then selected from among those options at step 2104. In some embodiments, the intended use may be stored in memory as part of a vehicle build file. For example, the intended use may be identified by retrieving the intended use from memory. To illustrate, a modular window may include glass, an encapsulation frame surrounding the glass with a first encapsulation frame side and a second encapsulation frame side opposite the first side, a mechanical interface located on the first encapsulation frame side, and a mating feature located on the second encapsulation frame side. If the intended use case is identified as fixed, then process 2100 may proceed to step 2106, which includes applying a bead of adhesive (e.g., glue) to the encapsulation frame, where the bead surrounds the glass and the mechanical interface (e.g., such that there are no gaps in adhesive). Step 2108 includes seating the modular window onto a window frame to secure the modular window to the window frame using the bead (e.g., such that the window is not removable under normal operation). Alternatively, if the intended use case was identified as venting or removable, then process 2100 proceeds to step 2110, which includes securing a bulb seal on the encapsulation frame (e.g., or alternatively on the window frame of the support), where the bulb seal surrounds the glass and the mechanical interface. Step 2112 includes coupling a living hinge to the mating feature and an actuator to the mechanical interface.

Figure 22:
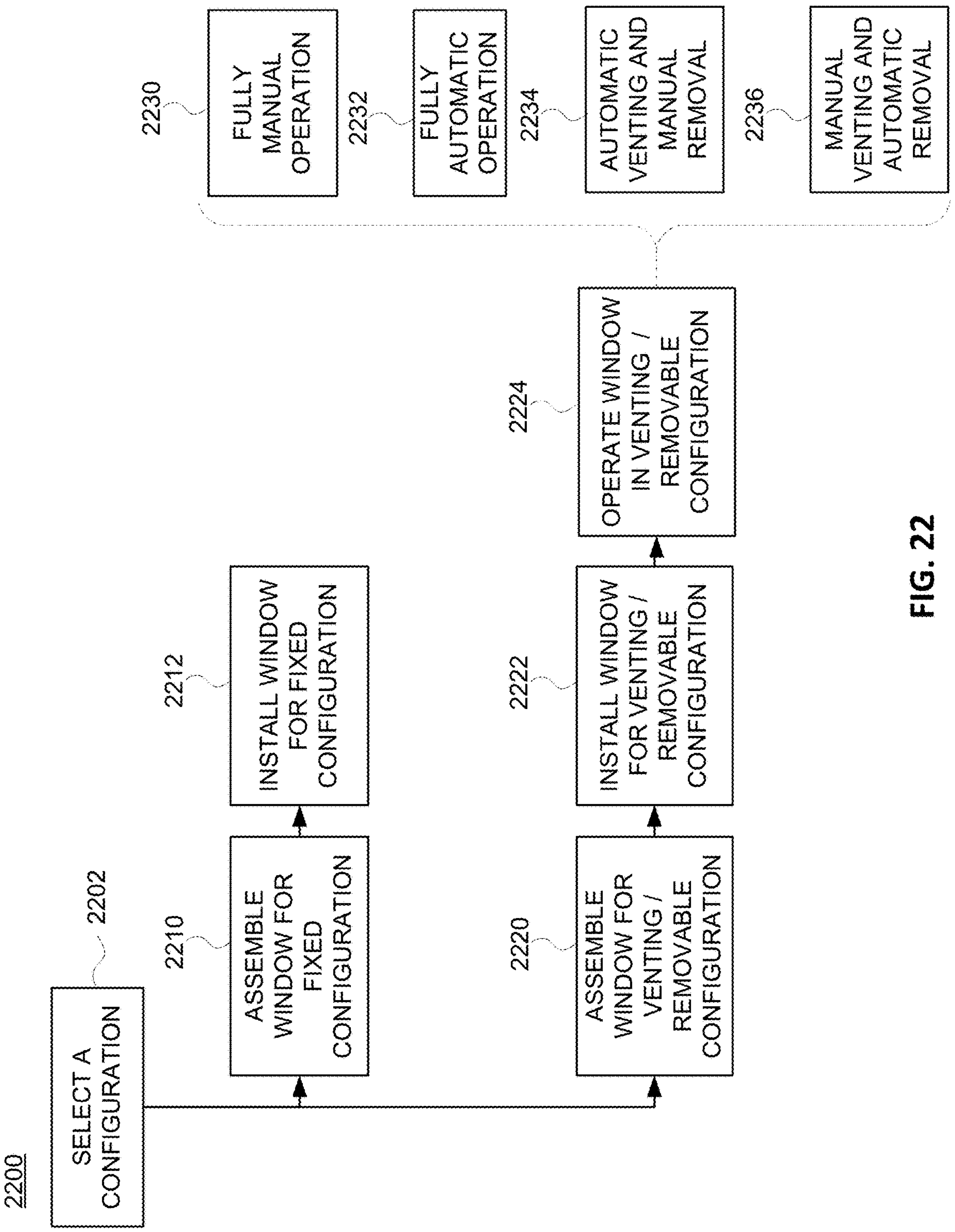
FIG. 22 is a flowchart of an illustrative process for assembling, installing, and operating a modular window, in accordance with some embodiments of the present disclosure.

FIG. 22 is a flowchart of illustrative process 2200 for assembling, installing, and operating a modular window, in accordance with some embodiments of the present disclosure. Step 2202 includes selecting a configuration of window such as, for example, fixed, venting, removable, or a combination thereof. For example, a window may configured as either fixed or venting/removable (e.g., there may be two selections available). In some embodiments, step 2202 may be same as either or both of steps 2102 and 2104 of FIG. 21.

For a fixed configuration selected at step 2202, step 2210 includes assembling the window for the fixed configuration. Step 2210 may include assembling a glass window pane and an encapsulation frame (e.g., a metal, composite, or plastic frame), hardware for venting even if not used, plugs or other components to seat recesses that would otherwise be used for venting/removal, any other suitable actions, or any combination thereof. Step 2212 includes installing the window in a vehicle in the fixed configuration (e.g., against a window frame or support thereof), which may include applying an adhesive bead, arranging the modular window in an opening of the vehicle, pressing the modular window into place, applying trim, coupling connectors for an antenna (e.g., for a radio antenna integrated into the window), any other suitable actions, or any combination thereof. In some embodiments, for example, a window may be assembled at step 2210 and include a latch, and the window may be installed at step 2212 to a support having a latch mount rather than a latch receiver. To illustrate, when installed in a vehicle having a latch mount rather than a latch receiver, the window remains in the fixed configuration. For example, the latch mount may include a recess sized to lock a hook of the latch such that it cannot rotate relative to the latch mount (e.g., the hook remains fully engaged with and within the recess).

For a venting and/or removable configuration selected at step 2202, step 2220 includes assembling the window for the venting/removable configuration. Step 2220 may include assembling a glass windowpane and an encapsulation frame (e.g., a metal, composite, or plastic frame), hardware for venting (e.g., latches, actuators, mechanical interfaces), hardware for removal (e.g., latches, actuators, mechanical interfaces), any other suitable actions, or any combination thereof. Step 2222 includes installing the window in a vehicle in the venting/removable configuration (e.g., against a window frame or support thereof), which may include installing a bulb seal, arranging the modular window in an opening of the vehicle (e.g., a window frame), pressing the modular window into place in the window frame, applying trim, coupling latching and actuator interfaces, coupling connectors for an antenna (e.g., for a radio antenna integrated into the window), any other suitable actions, or any combination thereof.

For a venting and/or removable configuration selected at step 2202, once installed at step 2222, the window system may be operated at steps 2224, using any of configurations 2230, 2232, 2234, or 2236, depending on the installation type at step 2222. Configuration 2230 includes fully manual operation, where both venting and removal are controlled by the user (e.g., using a mechanized link and/or latches). Configuration 2232 includes fully automatic operation, where venting and removal may be governed controlled by actuators and powered latches. Configuration 2234 includes automatic venting (e.g., using a linear actuator) and manual removal (e.g., a hand operated latch or removable living hinge). Configuration 2236 includes manual venting (e.g., a crank mechanism or swing-out mechanism) and automatic removal (e.g., using powered latches and an actuator to move the window off of the support).

Figure 23:
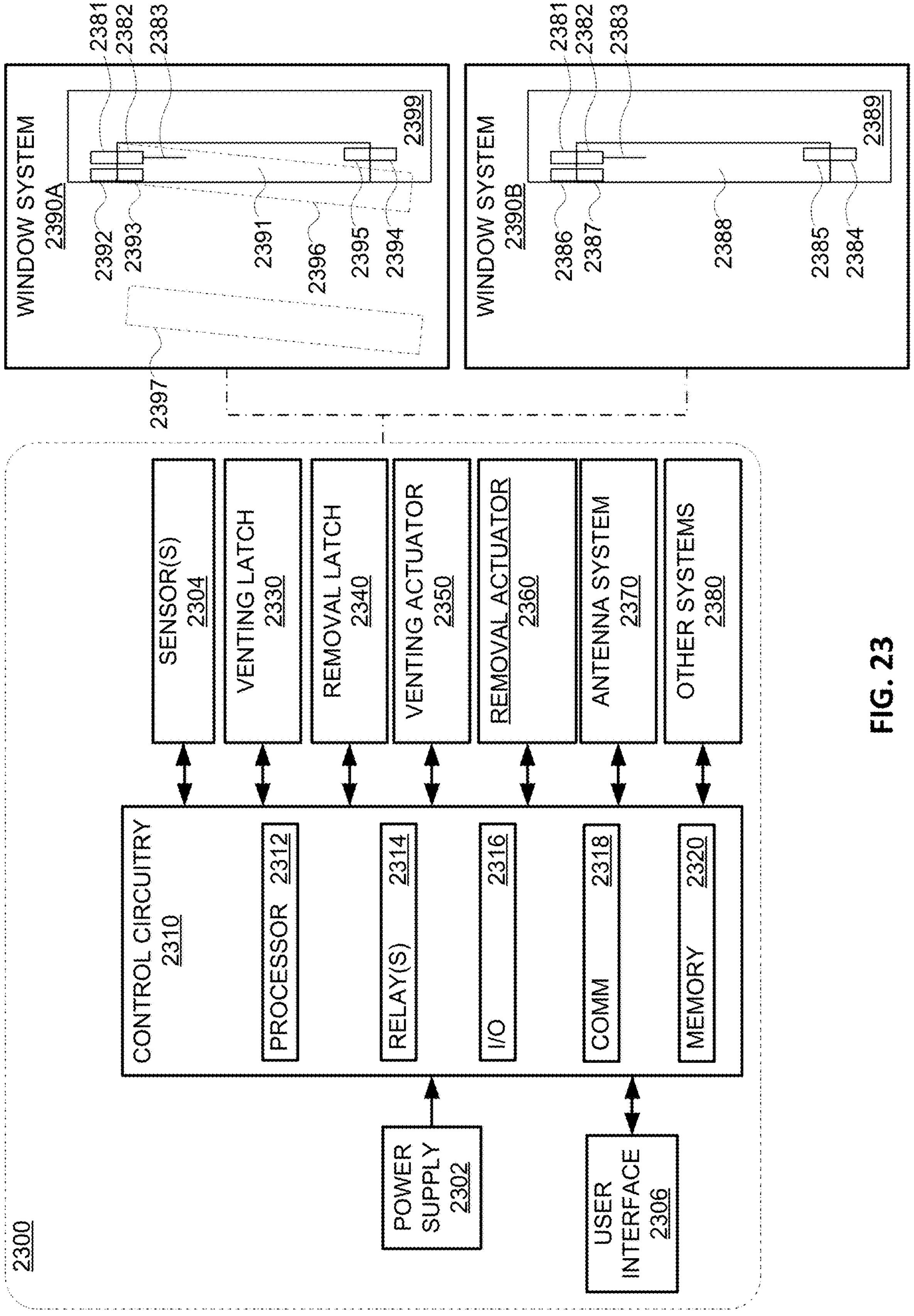
FIG. 23 shows a block diagram of an illustrative system for controlling a window of a vehicle, in accordance with some embodiments of the present disclosure.

FIG. 23 shows a block diagram of illustrative system 2300 for controlling a window of a vehicle, in accordance with some embodiments of the present disclosure. For example, system 2300 may be included as part of vehicle 100 of FIG. 1, having window 110. As illustrated, system 2300 includes control circuitry 2310, sensors 2304, user interface 2306, power supply 2302, venting latch 2330, removal latch 2340, venting actuator 2350, removal actuator 2360, antenna system 2370, and any other suitable systems (e.g., other system 2380), in accordance with some embodiments of the present disclosure. Illustrative control circuitry 310 includes processor 2312, one or more relays 2314, input/output 2316 (hereinafter referred to as I/O 2316), communication hardware 2318 (hereinafter referred to as COMM 2318), and memory 2320. Window system 2390A corresponds to an installation in which a window may achieve more than one configuration, while window system 2390B corresponds to an installation where the window is fixed.

Control circuitry 2310 may include hardware, software, or both, implemented on one or more modules configured to provide control of venting, removing, latching, locking/unlocking, or otherwise manipulation of a window. In some embodiments, processor 2312 includes one or more microprocessors, microcontrollers, digital signal processors, programmable logic devices, field-programmable gate arrays (FPGAs), application-specific integrated circuits (ASICs), or any suitable combination thereof. In some embodiments, processor 2312 is distributed across more than one processor or processing units. In some embodiments, control circuitry 2310 executes instructions stored in memory (e.g., non-transitory computer readable media) for managing the window. In some embodiments, memory 2320 is an electronic storage device that is part of control circuitry 2310. For example, memory may be configured to store electronic data, computer instructions, applications, firmware, or any other suitable information. In some embodiments, memory 2320 includes random-access memory, read-only memory, hard drives, optical drives, solid state devices, or any other suitable memory storage devices, or any combination thereof. In some embodiments, control circuitry 2310 may be similar to, or otherwise include components of control circuitry 1210, memory 1220, and processing circuitry 1230 of FIG. 12.

In some embodiments, control circuitry 2310 is powered by power supply 2302. In some embodiments, power supply 2302 includes a car battery (e.g., a 12 V lead acid battery), a DC-DC converter, an AC power supply (e.g., generated by suitably inverting a DC power supply), any other power supply, any corresponding components (e.g., terminals, switches, fuses, and cables), or any combination thereof. In some embodiments, power supply 2302 supplies power to sensors 2304, venting latch 2330, removal latch 2340, venting actuator 2350, removal actuator 2360, antenna system 2370, and any other suitable systems (e.g., other system 2380), or any combination thereof.

In some embodiments, user interface 2306 includes a push button, a toggle switch, a turnable knob, a display screen (e.g., a touch screen), a key fob, a key-lock combination, any other suitable system or component for receiving input from a user or providing output to a user, or any combination thereof. In some embodiments, user interface 2306 includes a touchscreen on the dash of a vehicle, configured to receive input from the user, and provide a display to the user. In some embodiments, user interface 2306 includes one or more buttons that are selectable by a user. For example, the one or more buttons may include a button coupled to a switch, a button on a touchpad, any other suitable button that may be used by a user to make a selection, or any combination thereof. In some embodiments, user interface 2306 includes one or more turnable knobs that a user may turn to adjust a venting setting, or latch setting, for example. User interface 2306 may be the same as, or include components of, user input device 1250 of FIG. 12.

In some embodiments, sensor(s) 2304 include one or more contact sensors (e.g., at least one set of electrical contacts wherein a voltage, current, or impedance is measured across the contracts to determine whether engaged or disengaged), position sensors (e.g., a rotary or linear encoder), proximity sensors, any other suitable sensors, or any combination thereof. For example, sensors 2304 may be used to determine whether window 2391 is in a sealed position, vented position, or removed position based on the feedback from one or more sensors. In a further example, sensors 2304 may be used to measure a relative position of window 2391 and support 2399. In a further example, sensors 2304 may be used to measure a position of venting latch 2330, removal latch 2340, venting actuator 2350, removal actuator 2360, antenna system 2370, or any combination thereof. Sensors 2304 may include one or more sensors of any suitable type or types.

Venting latch 2330 may include any suitable controllable latch to release a venting end of a window. For example, venting latch 2330 may include a hook-pin interface or other cinching interface controlled by an electromagnetic actuator (e.g., linear actuator 610 or any other suitable actuator). Venting actuator 2350 may be separate from, or integrated with, venting latch 2330. For example, venting actuator 2350 may include linear actuator 610 and venting latch 2330 may include a separate cinching latch.

Removal latch 2340 may include any suitable controllable latch to release a removal end of a window (e.g., a hinged end, an end having a living hinge). For example, removal latch 2340 may include a hook-pin interface or other cinching interface controlled by an electromagnetic actuator. Removal actuator 2360 may be separate from, or integrated with, removal latch 2340. For example, removal actuator 2360 may include an actuator for pushing window 2391 away from support 2399 in a controlled and predictable way (e.g., based on the trajectory of the actuator and any linkages), and removal latch 2340 may include a separate cinching latch.

In some embodiments, other systems 2380 may include an antenna system, for use with detecting radio waves for radio, network connectivity, or other electromagnetic signals. For example, window 2391 may include an embedded or attached antenna (e.g., antenna 2383), which may interface to the vehicle. In some embodiments, window 2391 includes element 2382 (e.g., an electrical connector such as a plug or socket), and support 2399 includes element 2381 (e.g., a mating electrical connector such as a socket or plug) that interfaces to element 2382. In some embodiments, removal of window 2391 may itself disconnect elements 2381 and 2382 (e.g., connectors configured to engage or disengage as the window is installed or removed), such that antenna 2383 is not electrically coupled to control circuitry 2310. In some embodiments, a user may need to manually disconnect elements 2381 and 2382 from each other (e.g., unplug the connectors when removing the window). In some embodiments, control circuitry 2310 may detect if elements 2381 and 2382 are engaged or disengaged, and either control connecting and disconnecting them, or generate a notification to a user (e.g., on user interface 2306) prompting the user to disengage or re-engage elements 2381 and 2382. In some embodiments, control circuitry 2310 is configured to determine that elements 2381 and 2382 are disengaged or otherwise that antenna 2383 is unavailable, and may select another antenna of the vehicle to use for communications. In some embodiments, for example, a vehicle includes more than one antenna (e.g., permanently mounted, or mounted in more than one window), and control circuitry 2310 may select from the antennas based on availability, signal strength, or any other suitable criteria. In some embodiments, elements 2381 and 2382 need not be configured to be disconnected or otherwise be flexible. For example, as illustrated by window system 2390B, in a fixed configuration, elements 2381 and 2382 may be connected and may remain connected because window 2390B is fixed.

For example, control circuitry 310 may execute computer readable instructions stored on non-transitory computer readable media to select from among configurations or window actuations (e.g., based on input from user interface 2306), retrieve reference information (e.g., from memory), generate and transmit control signals to any system of system 2300, receive and process sensor signals, or a combination thereof. System 2300, or control circuitry 2310 thereof, may be referred to herein as a control system (e.g., for controlling window system 2390A of a vehicle).

In an illustrative example, window system 2390A of a vehicle may include window 2391 and support 2399. A vehicle may include any suitable number of window systems (e.g., any suitable number of modular windows). Window 2391 may interface to support 2399 at two distinct regions. Removal element 2393 of window 2391 may interface to removal element 2392 of support 2399. Removal elements 2392 and 2393 may include a pivot (e.g., a hinged joint, a living hinge), an actuator, a latch, a sensor, locating features, an engageable and dis-engageable interface, any other suitable components or features, or any combination thereof. Venting element 2395 of window 2391 may interface to venting element 2394 of support 2399. Venting elements 2394 and 2395 may include an actuator (e.g., such as linear actuator 610), a latch, a sensor, locating features, an engageable and dis-engageable interface, any other suitable components or features, or any combination thereof. Any or all of removal elements 2392 and 2393, and venting elements 2394 and 2395, may be manual or otherwise controlled by control circuitry 2310 (e.g., as discussed in the context of process 2200). In some embodiments, window 2319 may be configured to remain in place (e.g., as illustrated, in a fixed configuration) and need not be controllable. In some embodiments, window 2319 may be configured to achieve a fixed, vented (e.g., configuration 2396), and removed configuration (e.g., configuration 2397).

In an illustrative example, window system 2390B of a vehicle may include window 2388 and support 2389. In some embodiments, a modular window may be configured to be controllable using control circuitry 2310, manually controllable, or not controllable. As illustrated, window 2388 is not controllable, and only achieves a fixed configuration. Window 2388 may interface to support 2389. While window 2388 may include removal element 2387 (e.g., similar to removal element 2393 of window 2391), it may be configured to interface to mounting element 2386 of support 2389, which does not allow removal. When installed in a vehicle having mounting element 2386 rather than removal element 2392, window 2388 may remain fixed in place interfaced to support 2389. Similarly, venting element 2395 of window 2391 may interface to mounting element 2384 of support 2389, which does not allow venting or removal. When installed in a vehicle having mounting element 2384 rather than venting element 2394, window 2388 may remain fixed in place interfaced to support 2389 (e.g., is not able to achieve a vented configuration). In some embodiments, a window may be configured to achieve a fixed, vented (e.g., configuration 2396), and removed configuration (e.g., configuration 2397) when installed in a first vehicle or first support type, but may only be able to achieve a fixed configuration in another vehicle or other support type. For example, windows 2391 and 2388 may be identical, but may have different functionality depending upon the type of support or vehicle they are installed in.

The processes described above are intended to be illustrative and not limiting. One skilled in the art would appreciate that the steps of the processes described herein may be omitted, modified, combined and/or rearranged, and any additional steps may be performed without departing from the scope of the invention. It will also be understood that the processes may be implemented at least in part using processing circuitry.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:

1. A window disconnect comprising:

a collar rotatably coupled to a vehicle window, wherein the collar comprises a keyed socket arranged at an end of the collar, wherein the keyed socket rotates with the collar relative to the vehicle window, and wherein the keyed socket comprises a slot, and a keyed ball comprising a ball having a first flat and a second flat arranged opposite each other, wherein:

the keyed ball is coupled to a vehicle support, in a first rotational orientation of the collar:

the first flat and the second flat are misaligned with the slot such that the keyed ball cannot translate into or out of the keyed socket; and the vehicle window is secured to the vehicle support such that the vehicle window is prevented from being removed from the vehicle support in a closed state of the vehicle window and a vented state of the vehicle window; and in a second rotational orientation of the collar:

the first flat and the second flat are aligned with the slot such that the keyed ball can translate into and out of the keyed socket such that the keyed ball is removable from the collar such that the vehicle window is removable from the vehicle support.

2. The window disconnect of claim 1, wherein the first rotational orientation and the second rotational orientation are between 80 and 100 degrees apart.

3. The window disconnect of claim 1, wherein:

the slot comprises sides;

in the second rotational orientation of the collar, the first flat and the second flat are parallel with the sides of the slot such that the keyed ball can translate into and out of the keyed collar; and in the first rotational orientation of the keyed socket, the first flat and the second flat are misaligned with the sides of the slot such that the keyed ball cannot translate into or out of the keyed socket.

4. The window disconnect of claim 1, further comprising:

a base affixed to the vehicle window, wherein the collar is rotatably coupled to the base.

5. The window disconnect of claim 1, further comprising:

an arm coupled to the keyed ball; and an actuator coupled to the arm and configured to move the arm based on a control signal to cause the vehicle window to move relative to the vehicle support when the keyed ball is locked in the keyed socket.

6. An apparatus comprising:

a support vehicle;

a vehicle window configured to interface with the vehicle support;

a collar rotatably coupled to the vehicle window, wherein the collar comprises a keyed socket arranged at an end of the collar, wherein the keyed socket rotates with the collar relative to the vehicle window, and wherein the keyed socket comprises a slot; and a keyed ball comprising a ball having a first flat and a second flat arranged opposite each other, wherein:

the keyed ball is coupled to the vehicle support;

in a first rotational orientation of the collar:

the first flat and the second flat are misaligned with the slot such that the keyed ball cannot translate into or out of the keyed socket; and the vehicle window is secured to the vehicle support and capable of achieving a closed configuration and a vented configuration; and in a second rotational orientation of the collar:

the first flat and the second flat are aligned with the slot such that the keyed ball can translate into and out of the keyed socket such that the keyed ball is removable from the collar such that the vehicle window is removable from the vehicle support.

7. The apparatus of claim 6, wherein the first rotational orientation and the second rotational orientation are between 80 and 100 degrees apart.

8. The apparatus of claim 6, wherein:

the slot comprises sides;

in the second rotational orientation of the collar, the first flat and the second flat are parallel with the sides of the slot such that the keyed ball can translate into and out of the collar; and in the first rotational orientation of the keyed socket, the first flat and the second flat are misaligned with the sides of the slot such that the keyed ball cannot translate into or out of the keyed socket.

9. The apparatus of claim 6, further comprising a base affixed to the vehicle window, wherein the collar is rotatably coupled to the base.

10. The apparatus of claim 6, further comprising:

an arm coupled to the keyed ball; and an actuator coupled to the arm and configured to move the arm based on a control signal to cause the vehicle window to move relative to the vehicle support when the keyed ball is locked in the keyed socket.

* * * * *